US012179371B2

(12) United States Patent
Hunt et al.

(10) Patent No.: US 12,179,371 B2
(45) Date of Patent: Dec. 31, 2024

(54) FOLDING MACHETE

(71) Applicant: Fiskars Brands, Inc., Middleton, WI (US)

(72) Inventors: Patrick Hunt, Carlton, OR (US); Jordan Prince, Wilsonville, OR (US)

(73) Assignee: FISKARS BRANDS, INC., Middleton, WI (US)

( * ) Notice: Subject to any disclaimer, the term of this patent is extended or adjusted under 35 U.S.C. 154(b) by 0 days.

(21) Appl. No.: 18/339,736

(22) Filed: Jun. 22, 2023

(65) Prior Publication Data

US 2023/0330874 A1 Oct. 19, 2023

Related U.S. Application Data

(60) Continuation of application No. 17/717,908, filed on Apr. 11, 2022, now Pat. No. 11,697,214, which is a (Continued)

(51) Int. Cl.

*B26B 1/04* (2006.01)
*B26B 1/10* (2006.01)

(52) U.S. Cl.

CPC ................ *B26B 1/04* (2013.01); *B26B 1/046* (2013.01); *B26B 1/10* (2013.01)

(58) Field of Classification Search

CPC .. B26B 1/00; B26B 1/04; B26B 1/046; B26B 1/10; B26B 1/46

(Continued)

(56) References Cited

U.S. PATENT DOCUMENTS 3,702,501 A 11/1972 Wood
4,547,965 A 10/1985 Moore
(Continued)

FOREIGN PATENT DOCUMENTS

CN 102990680 A 3/2013
CN 207172139 4/2018

OTHER PUBLICATIONS

International Search Report and Written Opinion for International Application No. PCT/IB2019/053885, mail date Dec. 12, 2019, 15 pages.

(Continued)

*Primary Examiner* — Nhat Chieu Q Do
(74) *Attorney, Agent, or Firm* — FOLEY & LARDNER LLP

(57) ABSTRACT

A knife includes a blade defining an aperture, a first handle and a second handle coupled to the blade. The knife includes a first catch coupled to the first handle and including a first protrusion, and a first spring coupled to the first handle and configured to apply a first biasing force on the first catch, and a second catch coupled to the second handle and including a second protrusion, and a second spring coupled to the second handle and configured to apply a second biasing force on the second catch. The first protrusion and the second protrusion are received within the aperture. The first handle rotates from a first position to a second position in a first direction about a first pivot axis and the second handle rotates from a third position to a fourth position in a second direction opposite the first direction about a second pivot axis.

21 Claims, 37 Drawing Sheets

Related U.S. Application Data division of application No. 16/408,551, filed on May 10, 2019, now Pat. No. 11,298,836.

(60) Provisional application No. 62/670,364, filed on May 11, 2018.

(58) Field of Classification Search
USPC .......................................... 30/153, 161, 340
See application file for complete search history.

(56) References Cited

U.S. PATENT DOCUMENTS 4,648,145 A 3/1987 Miceli
4,669,140 A 6/1987 Miceli
4,672,743 A 6/1987 Grahm
4,722,140 A 2/1988 Miceli
4,730,393 A 3/1988 Coburn
5,809,599 A 9/1998 Frazer
6,070,504 A 6/2000 Frazer
6,195,898 B1 3/2001 Lemisch
6,282,997 B1 9/2001 Frazer
6,434,834 B2 8/2002 Dimatteo et al.
6,550,142 B1 4/2003 Moser
6,848,183 B2 2/2005 Lemisch
7,325,312 B1 * 2/2008 Janich .................... B26B 29/02 30/155
7,676,930 B1 * 3/2010 Demko .................... B26B 1/04 30/340
7,752,759 B2 7/2010 Perreault
8,136,252 B2 3/2012 Linden et al.
8,147,159 B2 4/2012 Glesser et al.
RE43,908 E 1/2013 Demko
8,393,069 B2 3/2013 Glesser et al.
D710,166 S 8/2014 Cook
8,973,273 B2 3/2015 Brown et al.
D854,393 S 7/2019 Saunders
2004/0025354 A1 2/2004 Lemisch
2004/0181946 A1 9/2004 Lemisch
2006/0168819 A1 * 8/2006 Perreault ................ B26B 1/046 30/161
2007/0137047 A1 6/2007 Kim
2008/0222896 A1 9/2008 Marfione et al.
2014/0259687 A1 9/2014 Griffey
2016/0368155 A1 12/2016 Mandeville et al.
2017/0066144 A1 3/2017 Michael
2018/0036893 A1 2/2018 Ikoma

OTHER PUBLICATIONS

Foreign Action other than Search Report on CN 202210598225.6 DTD Nov. 20, 2023.

* cited by examiner

FOLDING MACHETE

CROSS-REFERENCE TO RELATED APPLICATION

This application is a continuation of U.S. application Ser. No. 17/717,908, filed Apr. 11, 2022, now U.S. Pat. No. 11,697,214, which is a divisional of U.S. application Ser. No. 16/408,551, filed on May 10, 2019, now U.S. Pat. No. 11,298,836, which claims the benefit of and priority to U.S. Provisional Application No. 62/670,364, filed May 11, 2018, all of which are incorporated by reference in their entireties.

BACKGROUND

The present invention relates generally to the field of knives and in particular to the field of knives that fold to facilitate storage and transportation.

SUMMARY

At least one embodiment relates to a knife. The knife includes a blade defining an aperture and a handle. The handle includes a body pivotably coupled to the blade, a catch movably coupled to the body, and a biasing member coupled to the body. The catch includes a protrusion. The biasing member is configured to apply a biasing force on the catch. The handle is selectively repositionable between a first position and a second position relative to the blade. The biasing force biases the protrusion of the catch toward the blade when the handle is in the first position. The protrusion is received by the aperture to prevent rotation of the handle relative to the blade when the handle is in the first position.

Another embodiment relates to a knife. The knife has a blade, a first handle, a second handle, and a latch. The first handle has a first proximal end portion pivotably coupled to the blade and a first distal end portion opposite the first proximal end portion. The second handle has a second proximal end portion pivotably coupled to the blade and a second distal end portion opposite the second proximal end portion. The second distal end defines a first locking mechanism and a second locking mechanism. The first locking mechanism and the second locking mechanism are separately and integrally formed on different sides of the second distal end. The latch is pivotably coupled to the second distal end portion and supports a locking pin. The locking pin is configured to selectively engage each of the first locking mechanism and the second locking mechanism separately. The first handle and the second handle are each selectively repositionable between an open position and a closed position. In the open position, the first handle and the second handle extend away from the blade. In the closed position, the first handle and the second handle extend along the blade. The first locking mechanism is configured to receive the locking pin when the first handle and the second handle are in the open position to lock the first handle and the second handle in the open positions. The second locking mechanism is configured to receive the locking pin when the first handle and the second handle are in the closed positions to lock the first handle and the second handle in the closed positions.

Another embodiment relates to a knife. The knife includes a blade defining an aperture and a handle. The handle includes a body pivotably coupled to the blade, a catch movably coupled to the body, and a torsion spring coupled to the body. The catch includes a protrusion. The torsion spring is configured to apply an outward rotational biasing force on the catch. The knife also includes a latch supporting a locking pin. The latch is rotatably coupled to the handle, and is movable between a first locking position and a second locking position where the locking pin engages different areas of the body of the handle. The handle is selectively repositionable between a first position and a second position relative to the blade. The biasing force biases the protrusion of the catch toward the blade when the handle is in the first position. The protrusion is received by the aperture to prevent rotation of the handle relative to the blade when the handle is in the first position. The locking pin is positioned in the first locking position when the handle is in the first position. In order to transition the handle from the first position to the second position, the latch must be rotated to remove the locking pin from the first locking position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
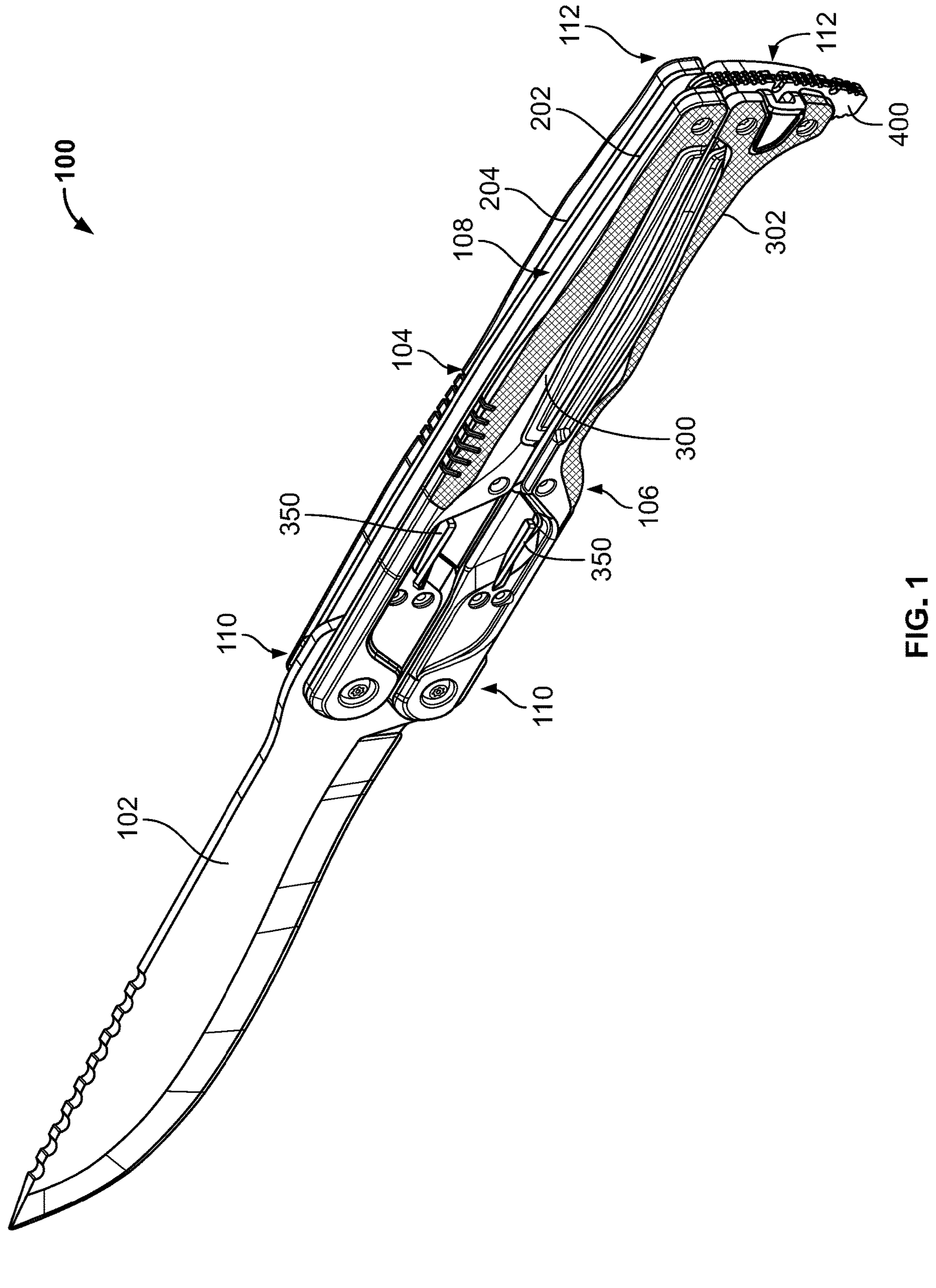
FIG. 1 is a perspective view of a folding machete, according to an exemplary embodiment.
Figure 2:
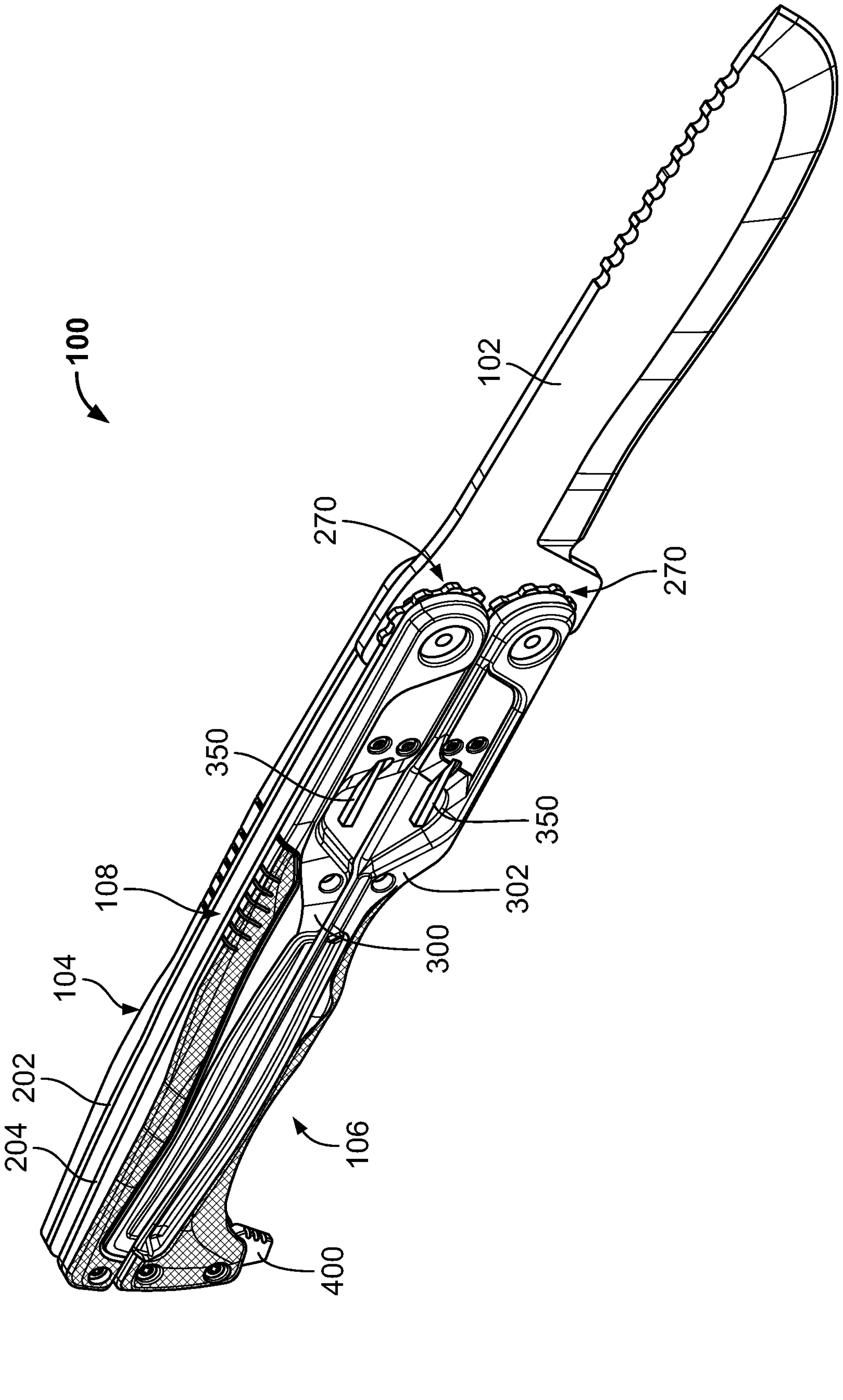
FIG. 2 is another perspective view of the folding machete of FIG. 1.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a machete includes a pair of folding handles pivotably coupled to a tang of a blade. The folding handles can be rotated relative to a blade to facilitate a user grasping the machete and covering the blade for storage. In an open position, the handles extend adjacent one another and away from the blade such that a user can hold both handles in one hand when using the machete. In a closed position, a slot defined in each handle having a "U" shaped cross-section receives the blade. The handles each include a gear. The gears engage one another and allow the handles to rotate relative to the blade at the same rate when opening and closing.

The machete further includes a pair of catches in each handle that selectively engage corresponding apertures defined in the blade. The catches can prevent rotation of the handles relative to the blade. The catches are each attached to the corresponding handles by a pin that allows rotation of the catch about the pin. A first end portion of the catch is shaped to engage the apertures of the blade, and an opposing second end portion of the catch engages a biasing member that urges the second end portion of the catch away from the blade. The apertures extend through the blade substantially perpendicular to the main surface of the blade, and the catches are biased by the biasing member (e.g., a torsion spring) to automatically rotate into the apertures when the handles rotate into the open position, the closed position, or an intermediate position. To release the catches, a user pushes on the second end portion of each catch. The intermediate position is located between the open and closed positions of the respective handle. In the intermediate position, the handles are spaced away from the blade to prevent the user from trapping their fingers.

The machete further includes a latch rotatably attached to one of the handles. In some embodiments, the latch defines a pair of opposing grooves. The other handle can include a latch pin. In the closed position, the latch can be rotated such that one of the grooves receives the latch pin, preventing movement of the handles. In the open position, the latch can be rotated such that the other groove receives the latch pin, preventing movement of the handles. The grooves are sized such that the latch pin is a snap fit into the grooves. In other embodiments, the a pin extends outward from at least one side of the latch. The pin on the latch selectively engages concave grooves formed in one of the handles to restrict relative rotation between the handles and the blade.

Referring to FIGS. 1-5 and 25-27D, collapsible knife assemblies, shown as folding machetes 100, 100' are illustrated according to exemplary embodiments. The folding machetes 100, 100' each include a blade 102, 102' pivotably coupled to a first handle, shown as top handle 104, 104' and a second handle, shown as bottom handle 106, 106'. The top handle 104, 104' and the bottom handle 106, 106' are each configured to rotate between an open position and a closed position. In the open position, shown in FIGS. 1-4, 25, and 27A, the top handle 104, 104' and the bottom handle 106, 106' extend away from the blade 102, 102'. In this position, the top handle 104, 104' and the bottom handle 106, 106' extend adjacent one another so that a user can wrap their hand around both the top handle 104, 104' and the bottom handle 106, 106' simultaneously to use the folding machete 100, 100'. In the closed position, shown in FIGS. 5 and 27D, the top handle 104, 104' and the bottom handle 106, 106' extend along the blade 102, 102', reducing the overall size of the folding machete 100, 100' to facilitate transport and storage. The top handle 104, 104' and the bottom handle 106, 106' each define a groove, channel, or slot 108, 108' that extends the entire length of the top handle 104, 104' or the bottom handle 106, 106' (i.e., from a proximal end portion 110, 110' that couples to the blade 102, 102' to a distal end portion 112, 112' opposite the proximal end portion 110, 110'). When the top handle 104, 104' and the bottom handle 106, 106' are in the closed positions, the blade 102, 102' (e.g., the entire length of the blade 102, 102', the majority of the length of the blade 102, 102', etc.) is received within the slots 108, 108'. This reduces the overall size of the folding machete 100, 100' and prevents contact between sharpened edges of the blade 102, 102' (e.g., the cutting edge 126, 126') and other objects. The closed position prevents the folding machete 100, 100' from becoming dull prematurely, reduces the likelihood of accidentally cutting another object during transport, and eliminates the need for a sheath.

Referring to FIGS. 6-9, 26, and 32, the blade 102, 102' is formed from a flat piece of material. The blade 102, 102' has a pair of main surfaces 120, 120'. The main surfaces 120,

120' include a flat portion 122, 122' and a tapered portion 124, 124'. The flat portions 122, 122' extend substantially parallel to one another. The tapered portions 124, 124' extend toward one another, meeting at a sharpened edge or cutting edge 126, 126'. The tapered portions 124, 124' and the cutting edge 126, 126' may be formed by grinding, for example, and may be formed of heat treated or hardened material. The cutting edge 126, 126' may be used to cut various materials, such as wood, grasses, sugar cane, coconuts, or meat. Opposite the cutting edge 126, 126', the blade 102, 102' defines a series of notches or jimping 128, 128'. The jimping 128, 128' provides a textured surface that may be used as a striking surface to be used for batoning. Batoning is a technique for splitting wood in which the user strikes the top of blade 102, 102' at the jimping 128, 128' (e.g., with a hammer, a mallet, a piece of wood, etc.) to drive the blade 102, 102' deeper into or through the wood being split.

The blade 102, 102' includes a handle interface section, shown as tang 140, 140', that extends away from the cutting edge 126, 126' and that acts as an interface between the blade 102, 102', the top handle 104, 104', and the bottom handle 106, 106'. The tang 140, 140' is formed between the flat portions 122, 122' of the main surfaces 120, 120'. The tang 140, 140' defines a series of apertures that extend through both of the main surfaces 120, 120'. A first aperture, shown as stop pin aperture 142, 142', is configured to receive a stop pin 144, 144'. The stop pin 144, 144' is a cylindrical pin that extends through the blade 102, 102' such that equal lengths of the stop pin 144, 144' extend on each side of the blade 102, 102'. The stop pin aperture 142, 142' may be sized as a press fit for the stop pin 144, 144' to hold the stop pin 144, 144' in place. The tang 140, 140' further defines a pair of second apertures, shown as handle connection apertures 146, 146'. The handle connection apertures 146, 146' facilitate the pivotable connection between the top handle 104, 104', the bottom handle 106, 106', and the blade 102, 102'. A pair of third apertures, shown as open position apertures 148, 148', a pair of fourth apertures, shown as intermediate position apertures 150, 150', and a pair of fifth apertures, shown as closed position apertures 152, 152', facilitate selectively locking the top handle 104, 104' and the bottom handle 106, 106' in the open position, an intermediate position, and the closed position, respectively.

Referring to FIGS. 6, 10, 11, 26, and 33A-33C, the top handle 104, 104' includes a body or top handle frame, shown as frame 200, 200'. The frame 200, 200' includes a first body member, shown as plate 202, 202', and a second body member, shown as plate 204, 204'. The plate 202, 202' and the plate 204, 204' are laterally offset from one another. A third body member, shown as connecting section 206, 206', extends between and fixedly couples to the plate 202, 202' and the plate 204, 204'. The slot 108, 108' of the top handle 104, 104' is defined between the plate 202, 202', the plate 204, 204', and the connecting section 206, 206'. The plate 202, 202', the plate 204, 204', and the connecting section 206, 206' together have a "U" shaped cross section such that the slot 108, 108' is also "U" shaped. In some embodiments, the plate 202, 202', the plate 204, 204', and the connecting section 206, 206' are formed from a single sheet of bent material. The plate 202, 202' and the plate 204, 204' are substantially the same length. The connecting section 206, 206' is shorter than the plate 202, 202' and the plate 204, 204'.

Referring to FIGS. 6, 12, 14, 26, and 34A-34C, the bottom handle 106, 106' includes a body or bottom handle frame, shown as frame 210, 210'. The frame 210, 210' includes a first body member, shown as plate 212, 212', and a second body member, shown as plate 214, 214'. The plate 212, 212' and the plate 214, 214' are laterally offset from one another. A third body member, shown as connecting section 216, 216', extends between and fixedly couples to the plate 212, 212' and the plate 214, 214'. The slot 108, 108' of the bottom handle 106, 106' is defined between the plate 212, 212', the plate 214, 214', and the connecting section 216, 216'. The plate 212, 212', the plate 214, 214', and the connecting section 216, 216' together have a "U" shaped cross section such that the slot 108, 108' is also "U" shaped. In some embodiments, the plate 212, 212', the plate 214, 214', and the connecting section 216, 216' are formed from a single sheet of bent material. The plate 212, 212' and the plate 214, 214' are substantially the same length. The connecting section 216, 216' is shorter than the plate 212, 212' and the plate 214, 214'.

Referring to FIGS. 1, 10-13, 26, and 33A-34C, the top handle 104, 104' is configured to engage the palm of a user, and the bottom handle 106, 106' is configured to engage the fingers of a user. Accordingly, the frame 200, 200' and the frame 210, 210' are shaped to facilitate this engagement. The height of the frame 200, 200' gradually decreases as the frame 200, 200' extends away from the connection to the blade 102, 102' (e.g., away from the proximal end portion 110, 110'). The height of the frame 210, 210' is substantially constant near the connection to the blade 102, 102'. Near the center of the frame 210, 210', the height of the frame 210, 210' fluctuates to create an ergonomic profile. For example, the contour of the frame 210, 210' can be defined by a height that decreases, then increases slightly and decreases again, forming finger rests. Near the end of the frame 210, 210' opposite the connection to the blade 102, 102' (e.g., the distal end portion 112, 112'), the height of the frame 210, 210' greatly increases, forming a pommel to prevent the folding machete 100, 100' from slipping out of the user's hand.

Referring to FIGS. 6, 10-13, 25-26, and 33A-34C, the plate 202, 202', the plate 204, 204', the plate 212, 212', and the plate 214, 214' each define a series of apertures, shown as mounting holes 220, 220'. The mounting holes 220, 220' are threaded to receive fasteners 222, 222' that couple other components (e.g., the top scales 300, 300' and the bottom scales 302, 302') to the frame 200, 200' and the frame 210, 210'. The plate 202, 202' and the plate 204, 204' each define a first aperture, shown as pin aperture 224, 224'. The pin apertures 224, 224' are sized to receive a first dowel or pin, shown as pivot pin 226, 226'. The pin apertures 224, 224' and the pivot pin 226, 226' extend perpendicular to the plate 202, 202' and the plate 204, 204'. In some embodiments, the plate 212 and the plate 214 each define a second aperture, shown as pin aperture 228. The pin apertures 228 are sized to receive a second dowel or pin, shown as latch pin 230. The pin apertures 228 and the latch pin 230 extend perpendicular to the plate 212 and the plate 214.

The plate 202, 202', the plate 204, 204', the plate 212, 212', and the plate 214, 214' each define an aperture, shown as handle connection aperture 240, 240'. The handle connection apertures 240, 240' are configured to receive a female fastener, shown as outer sleeve 242, 242', and a male fastener, shown as fastener 244, 244'. The outer sleeves 242, 242' and the fasteners 244, 244' extend through both of the handle connection apertures 240, 240' of one of the frames and one of the handle connection apertures 146, 146' of the blade 102, 102', pivotably coupling the frame 200, 200' and the frame 210, 210' to the blade 102, 102'. The outer sleeves 242, 242' each define an outer surface that engages the edges of the corresponding handle connection apertures 240, 240' and the handle connection aperture 146, 146'. The outer sleeves 242, 242' each define a threaded aperture that receives the fastener 244, 244'. The handle connection apertures 240, 240', the outer sleeve 242, 242', and the fasteners 244, 244' all extend perpendicular to the plate 202, 202', the plate 204, 204', the plate 212, 212', and the plate 214, 214'. Accordingly, the frame 200, 200' and, by extension, the top handle 104, 104' rotate about an axis of rotation 246, 246' relative to the blade 102, 102'. The frame 210, 210' and, by extension, the bottom handle 106, 106' rotate about an axis of rotation 248, 248' relative to the blade 102, 102'. The axis of rotation 246, 246' and the axis of rotation 248, 248' extend perpendicular to the plate 202, 202', the plate 204, 204', the plate 212, 212', the plate 214, 214', and the flat portions 122, 122' of the blade 102, 102'.

Figure 6:
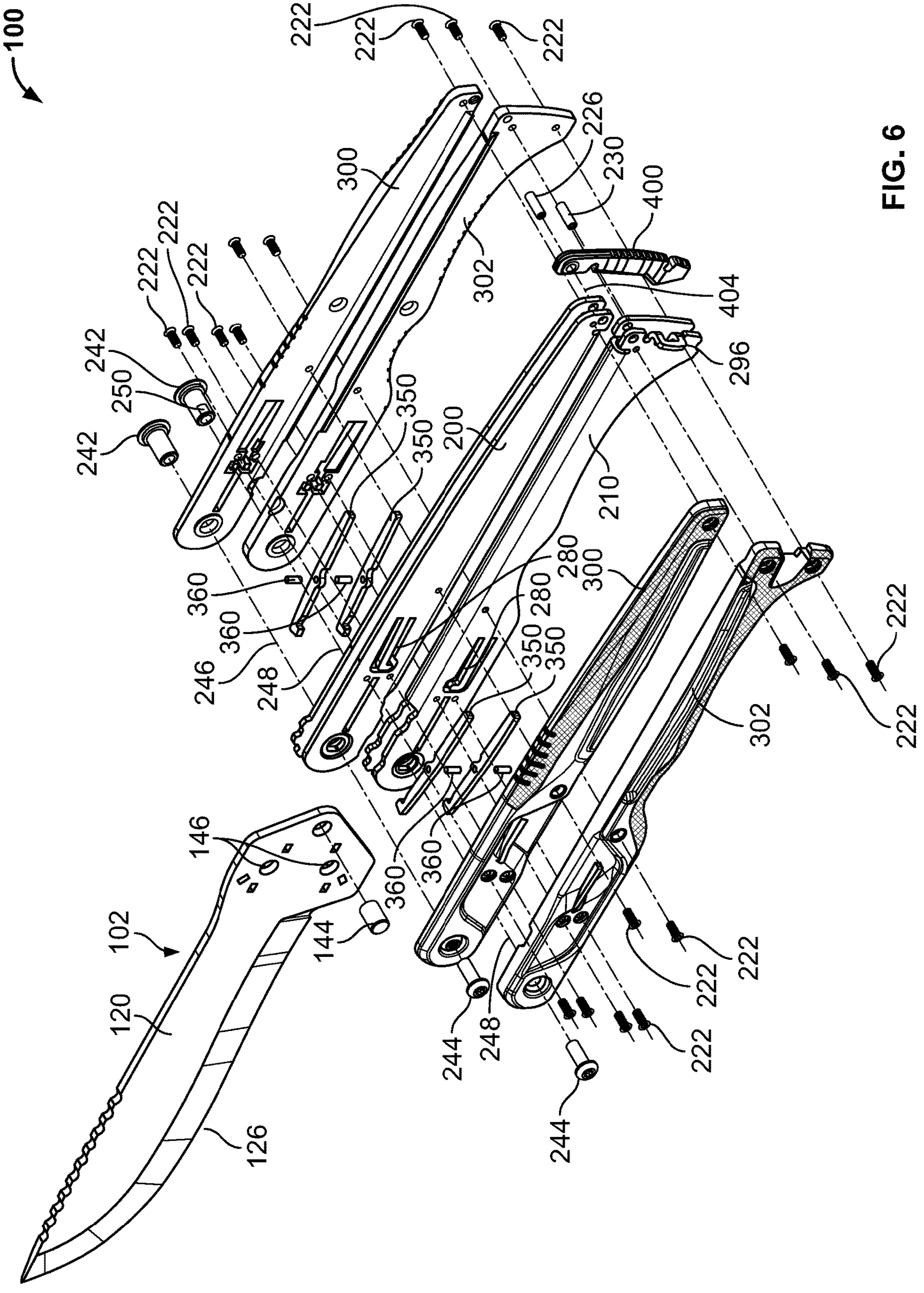
FIG. 6 is an exploded view of the folding machete of FIG. 1.
Figure 14:
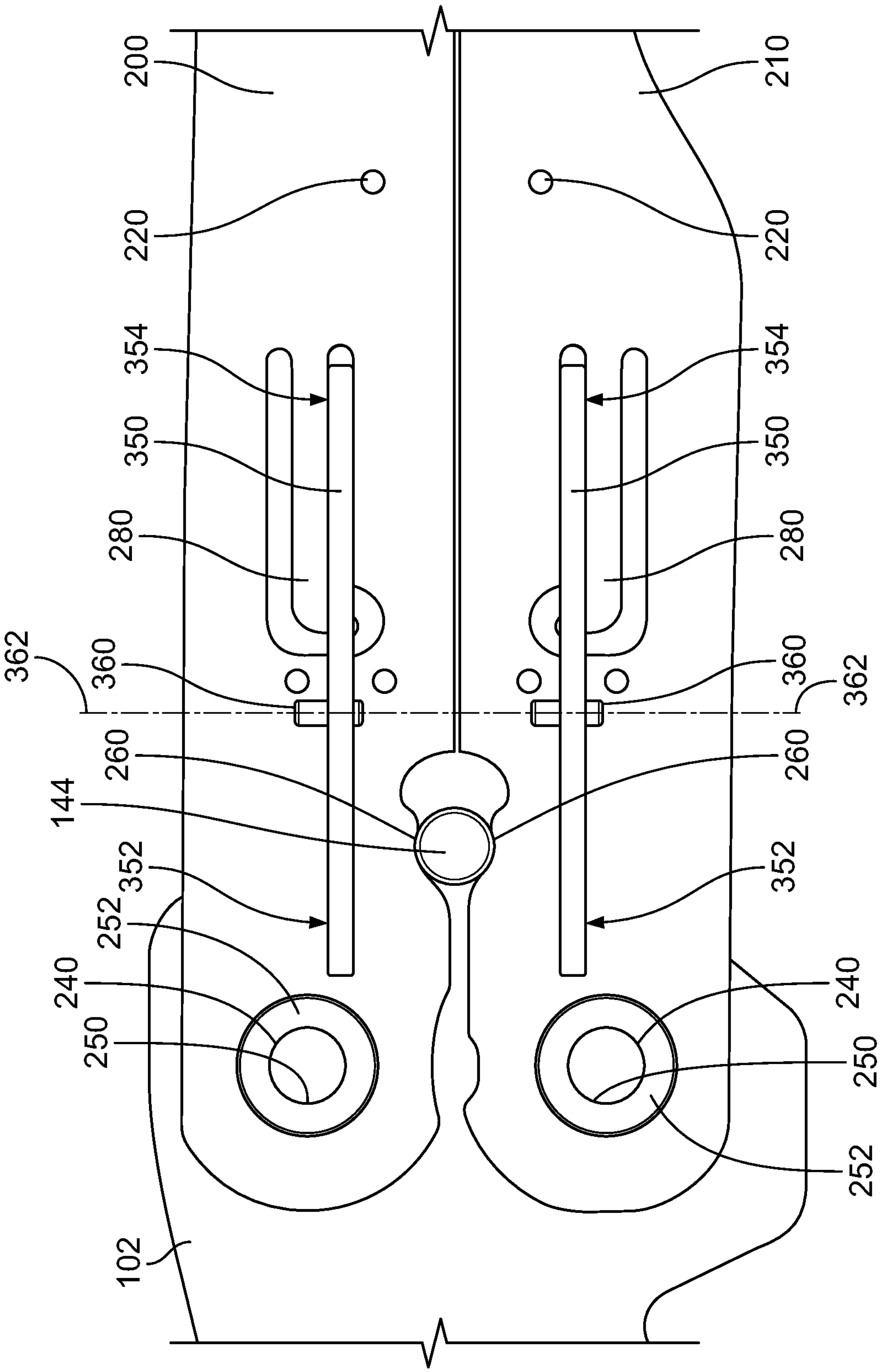
FIG. 14 is a side view of the blade of FIG. 7, the frame of FIG. 10, and the frame of FIG. 12.
Figure 15:
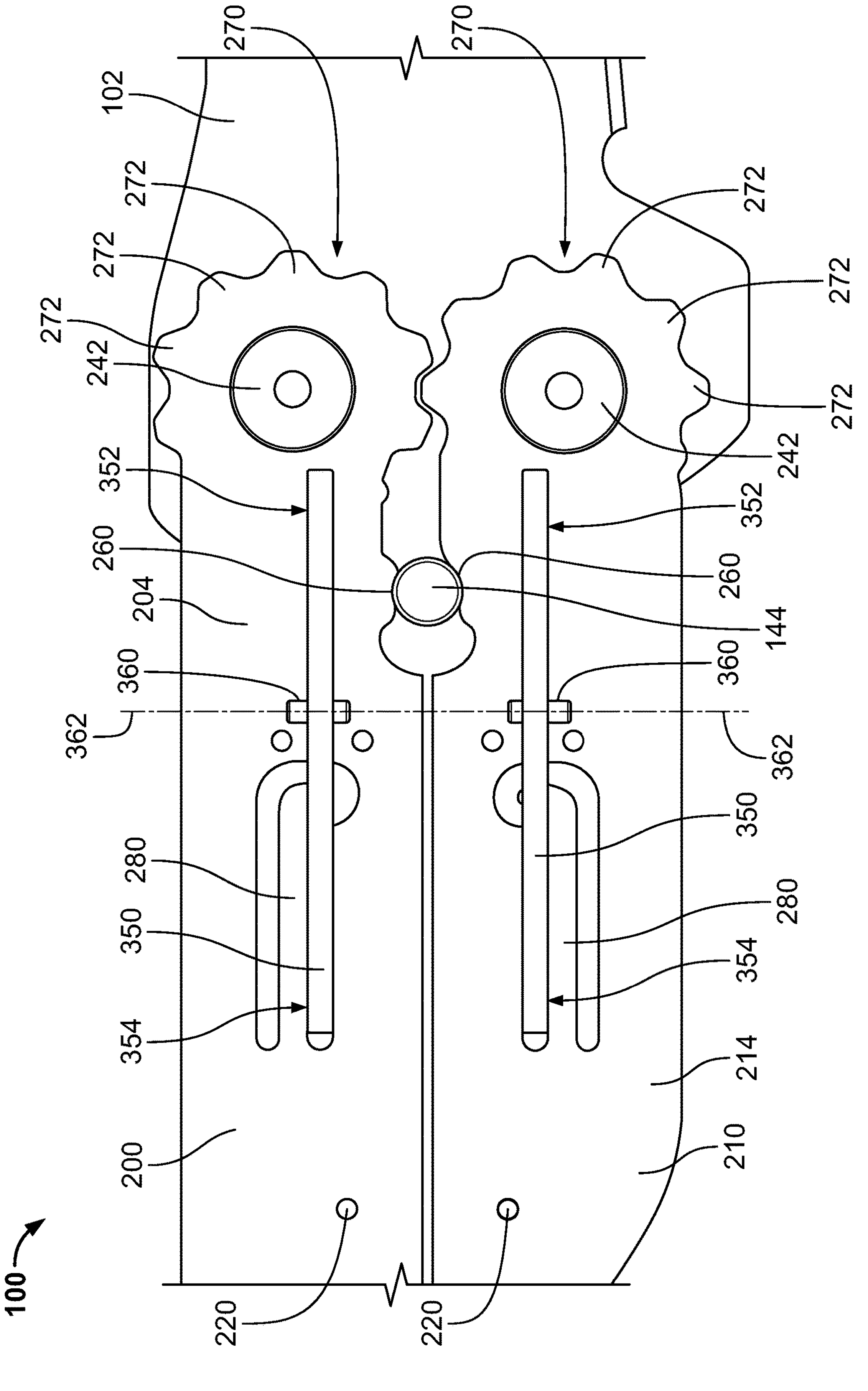
FIG. 15 is another side view of the blade of FIG. 7, the frame of FIG. 10, and the frame of FIG. 12.
Figure 16:
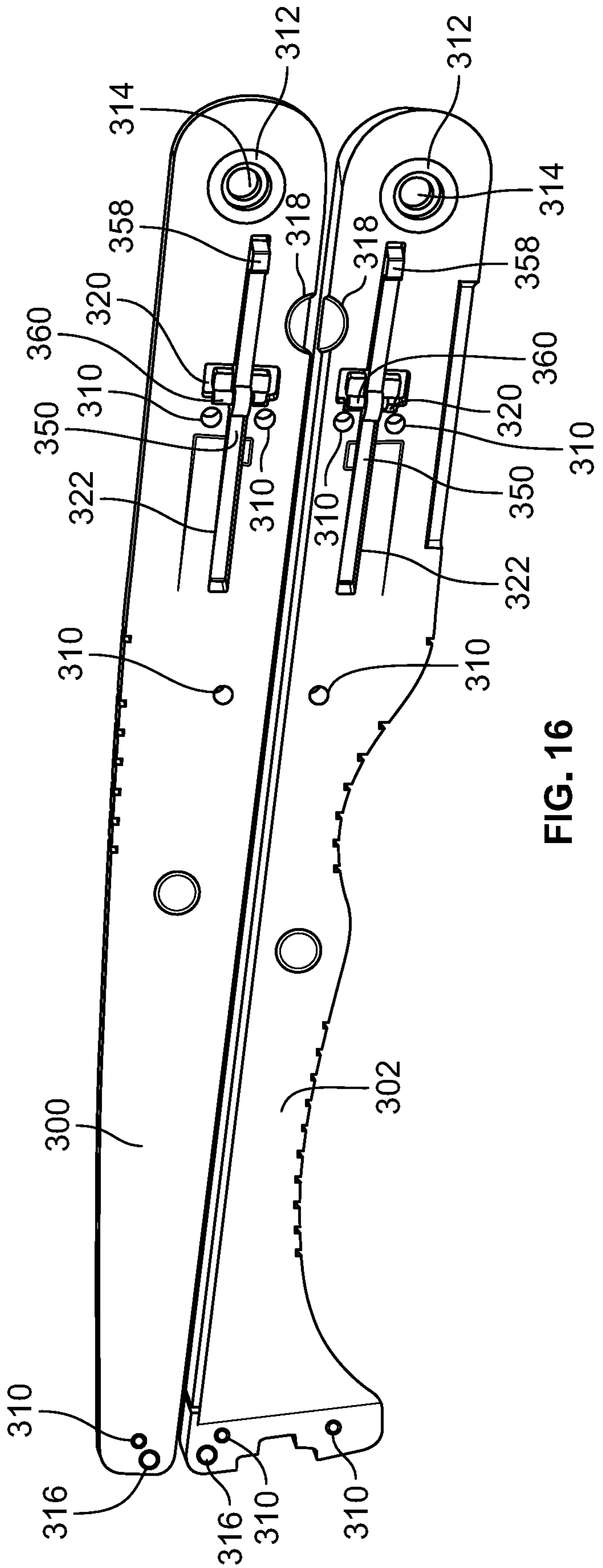
FIG. 16 is a perspective view of a scale of the first handle and a scale of the second handle of the folding machete of FIG. 1.
Figure 17:
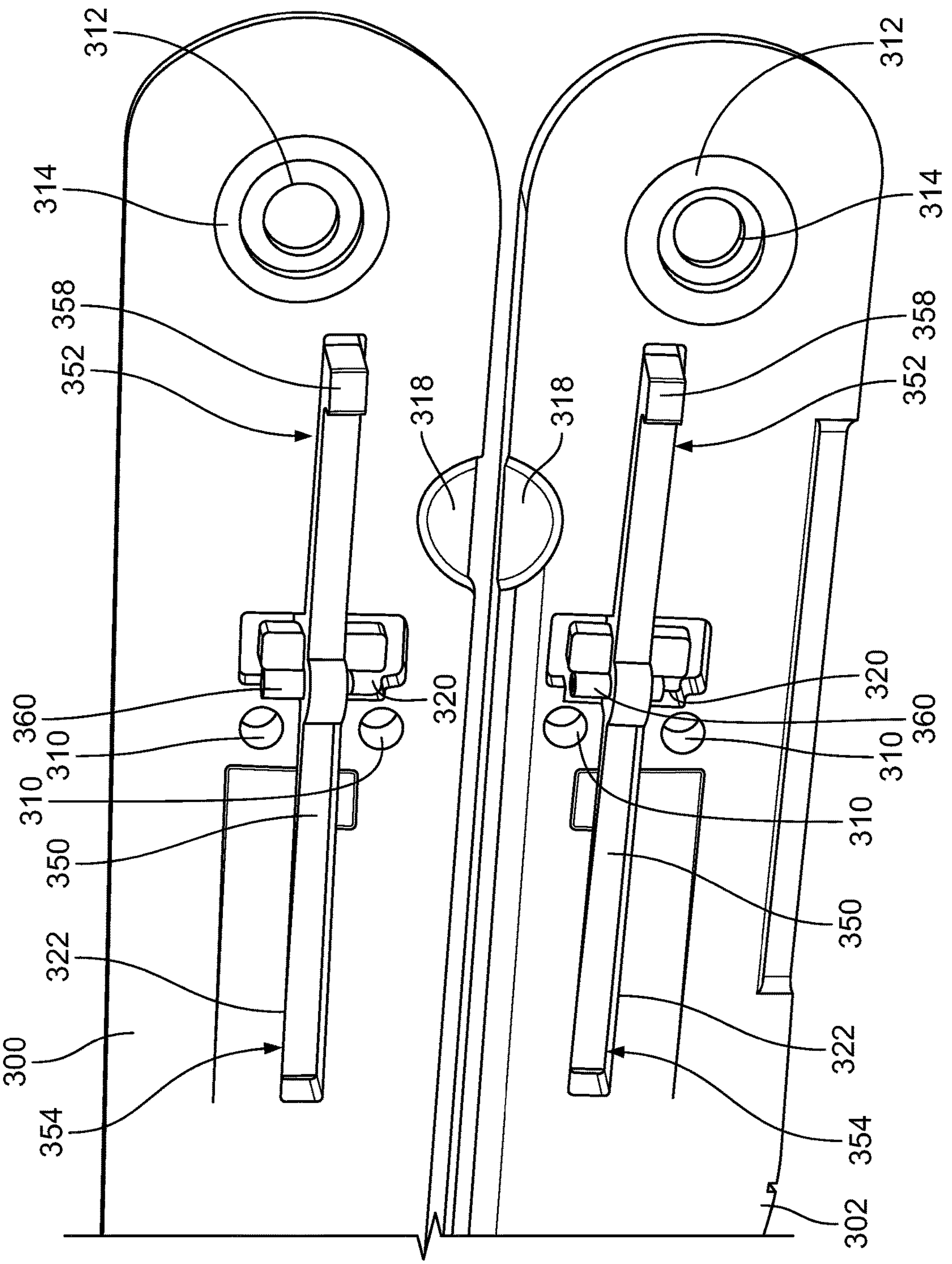
FIG. 17 is another perspective view of the scales of FIG. 16.
Figure 18:
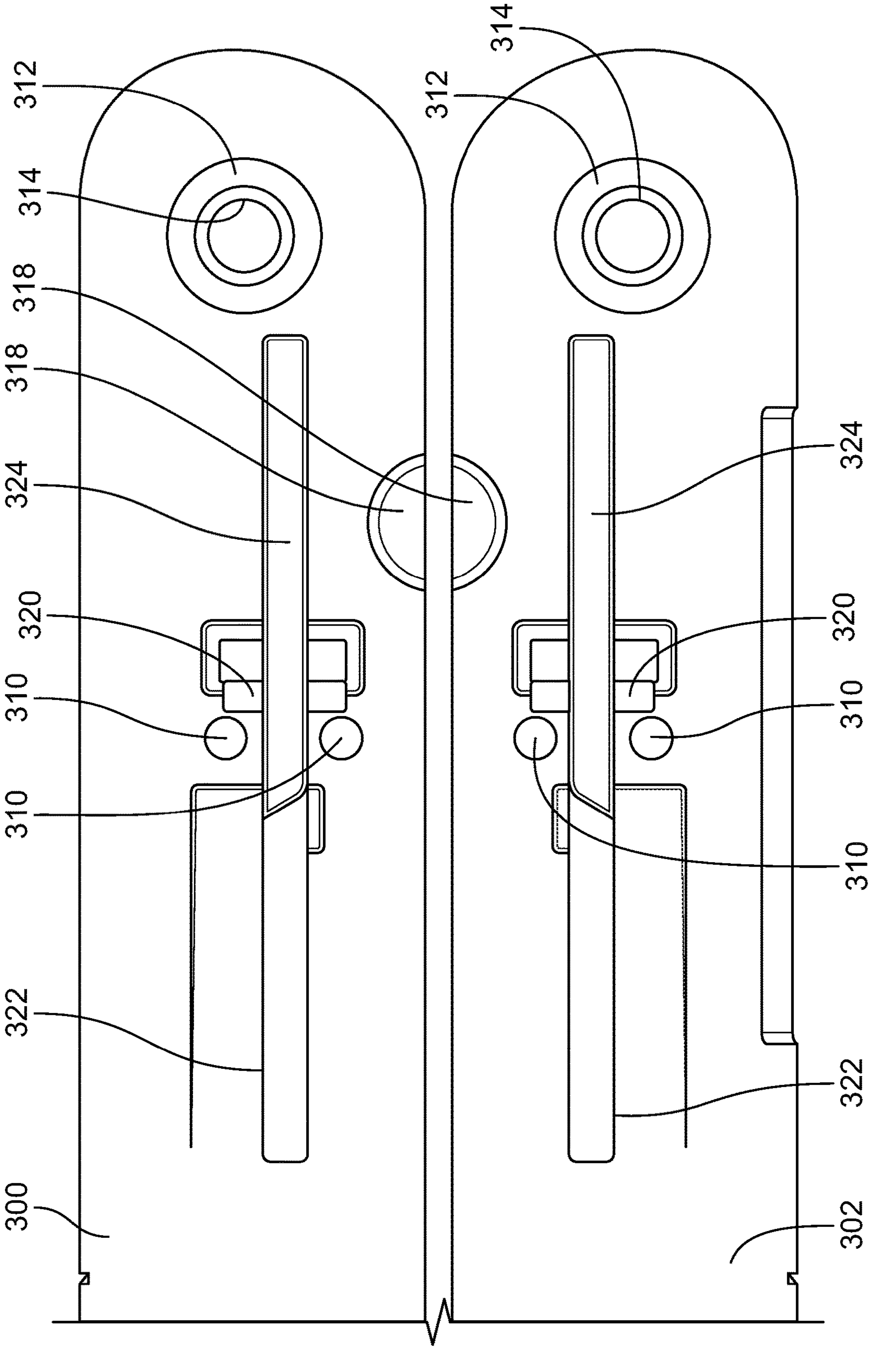
FIG. 18 is a side view of the scales of FIG. 16.
Figure 19:
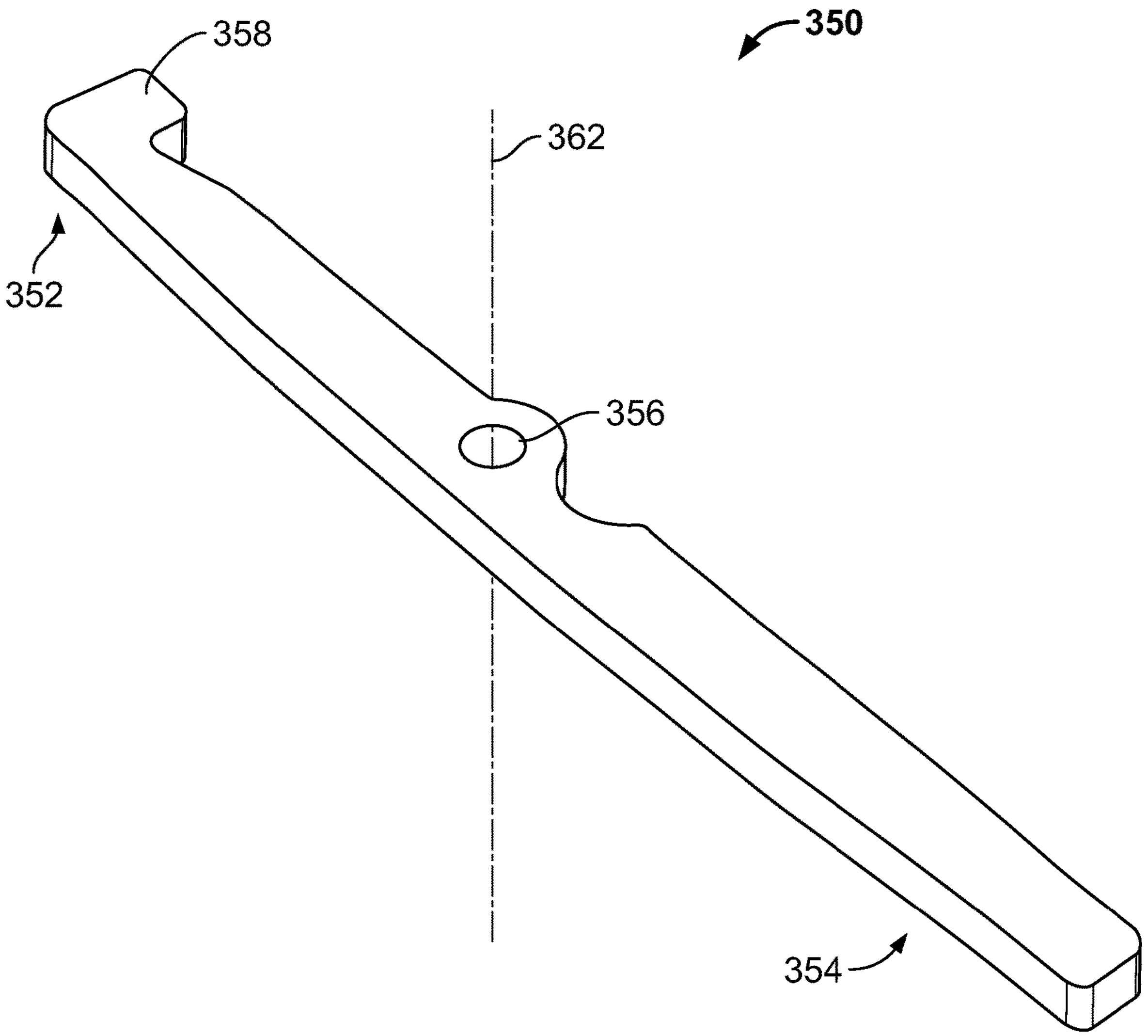
FIG. 19 is a perspective view of a catch of the folding machete of FIG. 1.
Figure 20:
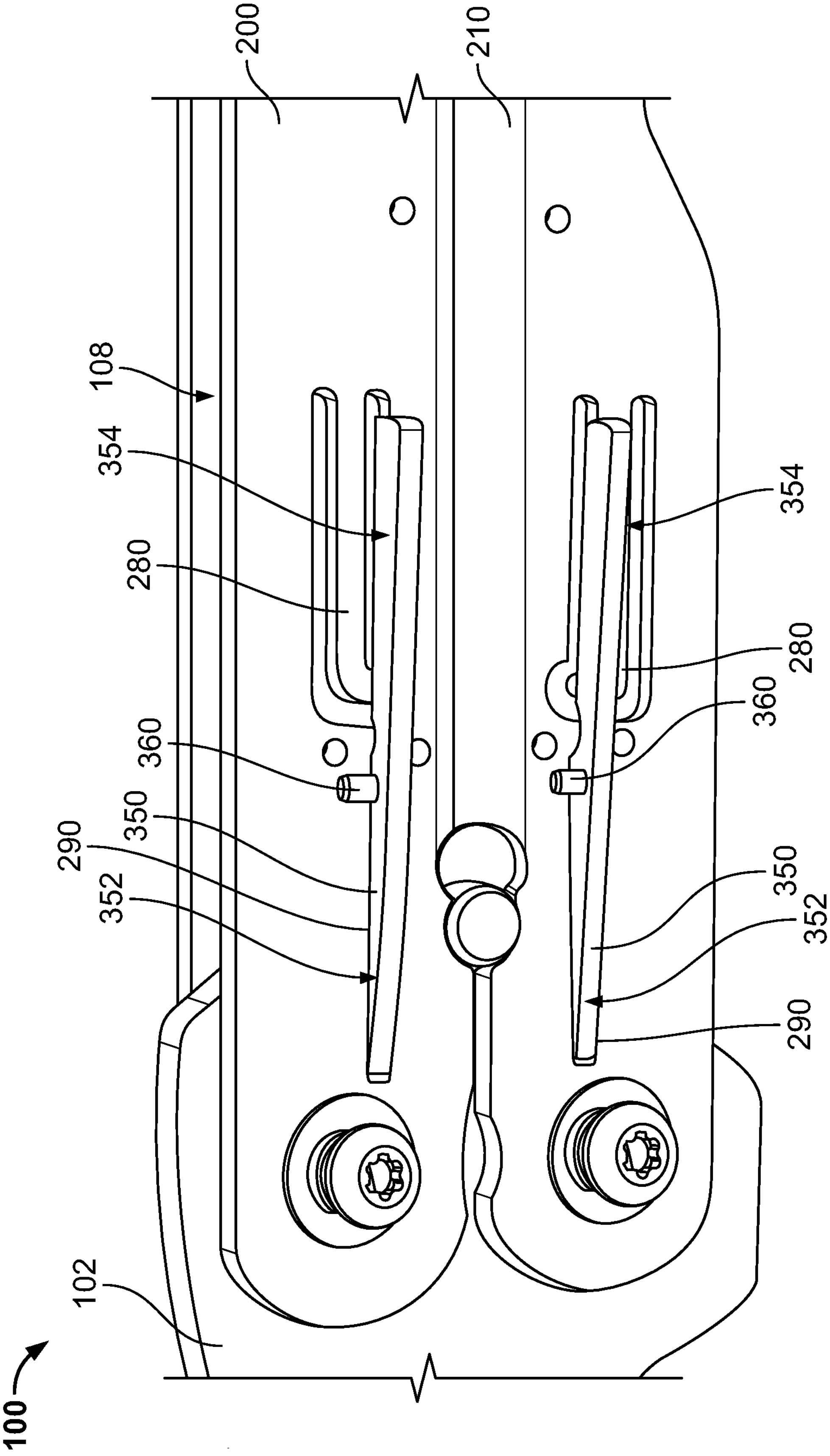
FIG. 20 is a perspective view of the folding machete of FIG. 1 with the scales of FIG. 16 removed.
Figure 21:
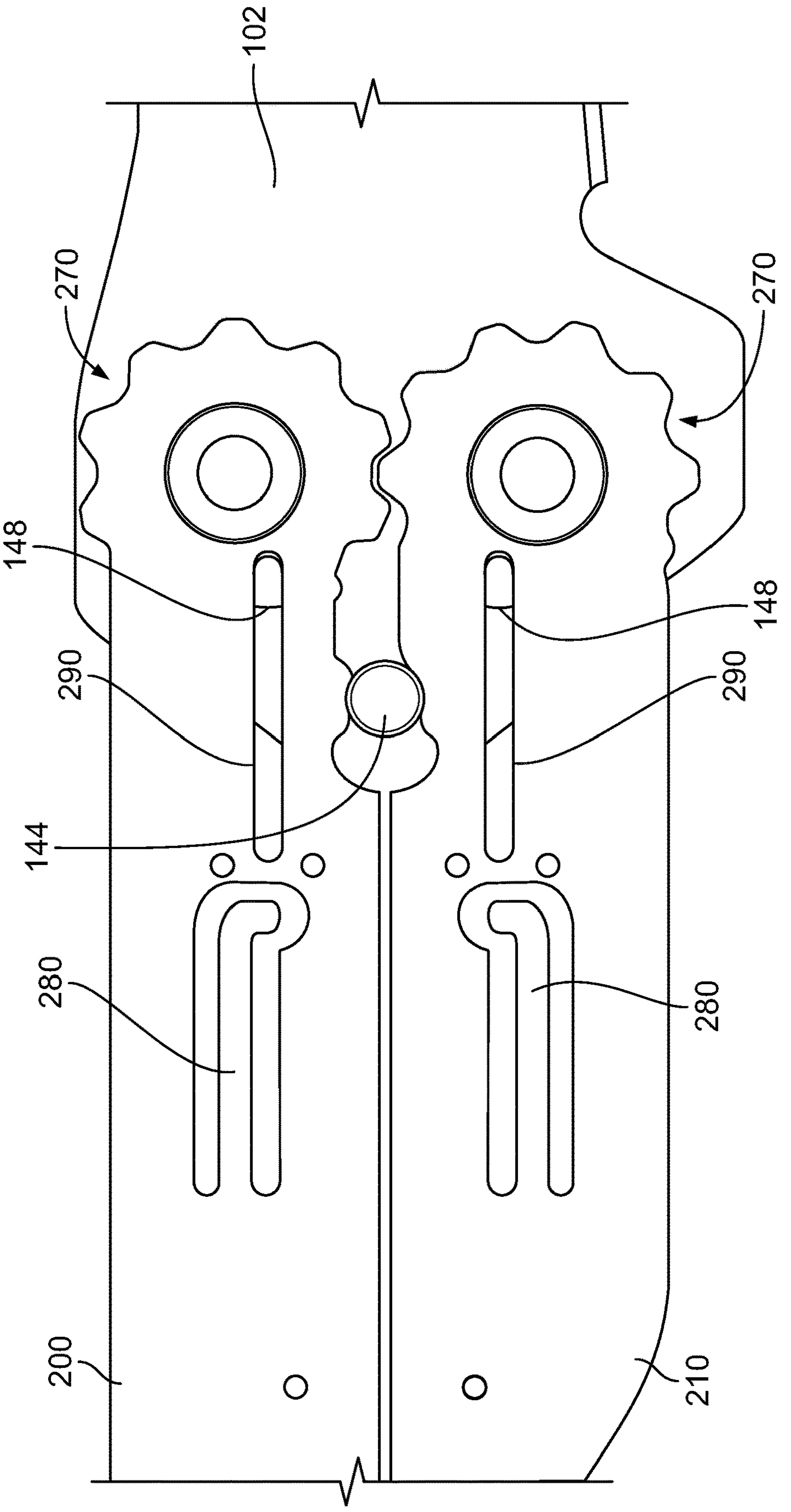
FIG. 21 is a side view of the blade of FIG. 7, the frame of FIG. 10, and the frame of FIG. 12.

As shown in FIGS. 6 and 14, the outer sleeve 242 and one of the handle connection apertures 240 of each frame define corresponding flat surfaces 250 that engage one another to prevent the outer sleeve 242 from rotating relative to the corresponding frame. This prevents the outer sleeves 242 from rotating and loosening the fasteners 244 as the top handle 104 and the bottom handle 106 are rotated relative to the blade 102. Additionally, and with additional reference to FIGS. 26 and 33A-34C, the plate 202, 202', the plate 204, 204', the plate 212, 212', and the plate 214, 214' each form a circular depression 252, 252' that extends laterally inward toward the slot 108, 108'. The circular depressions 252, 252' are centered around the corresponding handle connection apertures 240, 240'. The circular depressions 252, 252' may be formed by stamping such that a corresponding circular protrusion extends into the slot 108, 108'.

Referring to FIGS. 11, 13, 14, and 33A-34C, the sides of the plate 202, 202', the plate 204, 204', the plate 212, 212', and the plate 214, 214' each define a recess 260, 260' configured to receive the stop pin 144, 144'. Engagement between the frame 200, 200' and the stop pin 144, 144' and between the frame 210, 210' and the stop pin 144, 144' ensures that the open positons of the top handle 104, 104' and the bottom handle 106, 106' are consistent each time the folding machete 100, 100' is opened. Additionally, the stop pin 144, 144' prevents the top handle 104, 104' and the bottom handle 106, 106' from moving beyond the open position. Accordingly, the stop pin 144, 144' facilitates a consistent operation of the folding machete 100, 100' while ensuring that the blade 102, 102' does not move relative to the top handle 104, 104' or the bottom handle 106, 106' when the user grips both the top handle 104, 104' and the bottom handle 106, 106' in the open position. In some embodiments, each of the plates 202', 204', 212', 214' define a relief groove 298'. The relief groove 298' can be formed away from the recesses 260', and can have a smoothly-curving concave shape extending to the connecting sections 206', 216' of each handle 104', 106'.

Referring to FIGS. 11, 12, 15, and 33A-34C, the plate 204, 204' and the plate 214, 214' each define a gear 270, 270'. Each gear 270, 270' includes a series of protrusions, shown as gear teeth 272, 272', extending radially outward along the side of the plate 204, 204' or the plate 214, 214'. The gears 270, 270' are radially centered about the axis of rotation 246, 246' and the axis of rotation 248, 248', respectively, such that each of the gear teeth 272, 272' corresponding to the first gear 270, 270' are equidistant from the axis of rotation 246, 246' and each of the gear teeth 272, 272' corresponding to the second gear 270, 270' are equidistant from the axis of rotation 248, 248' (i.e., the pitch circle of each gear 270, 270' is centered about the corresponding axis of rotation). The gear teeth 272, 272' of the frame 200, 200' engage the gear teeth 272, 272' of the frame 210, 210', coupling the rotation of the top handle 104, 104' and the rotation of the bottom handle 106, 106'. Accordingly, when the top handle 104, 104' rotates relative to the blade 102, 102', the engagement between the gears 270, 270' causes the bottom handle 106, 106' to rotate relative to the blade 102, 102'. By way of example, when the top handle 104, 104' rotates toward the open position, the gears 270, 270' cause the bottom handle 106, 106' to rotate toward the open position simultaneously. Both of the gears 270, 270' have the same pitch diameter and utilize gear teeth 272, 272' having the same diametrical pitch. Accordingly, the gears 270, 270' cause the top handle 104, 104' and the bottom handle 106, 106' to rotate at the same rate relative to the blade 102, 102'. The gears 270, 270' facilitate a faster and more controlled opening or closing of the folding machete 100, 100', as a user can control movement of both the top handle 104, 104' and the bottom handle 106, 106' using only one hand.

Referring to FIGS. 10-13, and 28A-31B, the top handle 104, 104' and the bottom handle 106, 106' each include a pair of biasing members 280, 280'. In some embodiments, spring bars, shown as spring tabs 280, can be used as part of a catch mechanism. Specifically, the plate 202, the plate 204, the plate 212, and the plate 214 can each be coupled to a spring tab 280. The plate 202, the plate 204, the plate 212, and the plate 214 each define an aperture, shown as spring tab aperture 282, that receives the corresponding spring tab 280. Each spring tab 280 includes a longitudinal section 284 and a vertical protrusion 286. The longitudinal section 284 extends partway across the corresponding spring tab aperture 282, extending lengthwise along the frame 200 or the frame 210 toward the handle connection aperture 240. A proximal end of each longitudinal section 284 is coupled to the corresponding plate. The vertical protrusion 286 is coupled to a distal end of the longitudinal section 284 opposite the proximal end. The vertical protrusion 286 extends vertically from the longitudinal section 284. Specifically, when the top handle 104 and the bottom handle 106 are in the open position, the vertical protrusion 286 extends toward a longitudinal centerline of the folding machete 100. By way of example, when the top handle 104 and the bottom handle 106 are in the closed position, the vertical protrusion 286 of the spring tab 280 coupled to the plate 202 extends toward the plate 212. Each spring tab 280 is bent outward from the corresponding plate. When a force is applied that pushes the spring tab 280 toward the slot 108, the spring tab 280 resists bending, applying a biasing force oriented laterally outward from the slot 108. In some embodiments, the spring tabs 280 are integrally formed with the frame 200 or the frame 210.

Alternatively, the top handle 104' and bottom handle 106' can each include torsion springs 280'. The torsion springs 280' can be positioned within apertures 282' that extend through each of the plates 202', 204', 212', 214'. Each handle 104', 106' can include two torsion springs 280' that are coupled to the handles 104', 106'. Each torsion spring 280' can be anchored to one of the plates 202', 204', 212', 214', and extend laterally outward, away from the plate 202' 204', 212', 214' the torsion spring 280' is anchored to. The torsion springs 280' provide a rotational bias that resists rotation inward, toward the plates 202', 204', 212', 214'. In other embodiments, different types of biasing members can be used, such as compression springs that engage the plate 202, for example.

The plate 202, 202', the plate 204, 204', the plate 212, 212', and the plate 214, 214' each also define an aperture, shown as catch slot 290, 290'. The catch slot 290, 290' extends lengthwise along the frame 200, 200' or the frame 210, 210'. The catch slot 290, 290' extends between the handle connection aperture 240, 240' and the aperture 282, 282'. The catch slot 290 can be aligned with the vertical protrusion 286 of the spring tab 280. The catch slot 290' can be offset from the aperture 282'.

Figure 13:
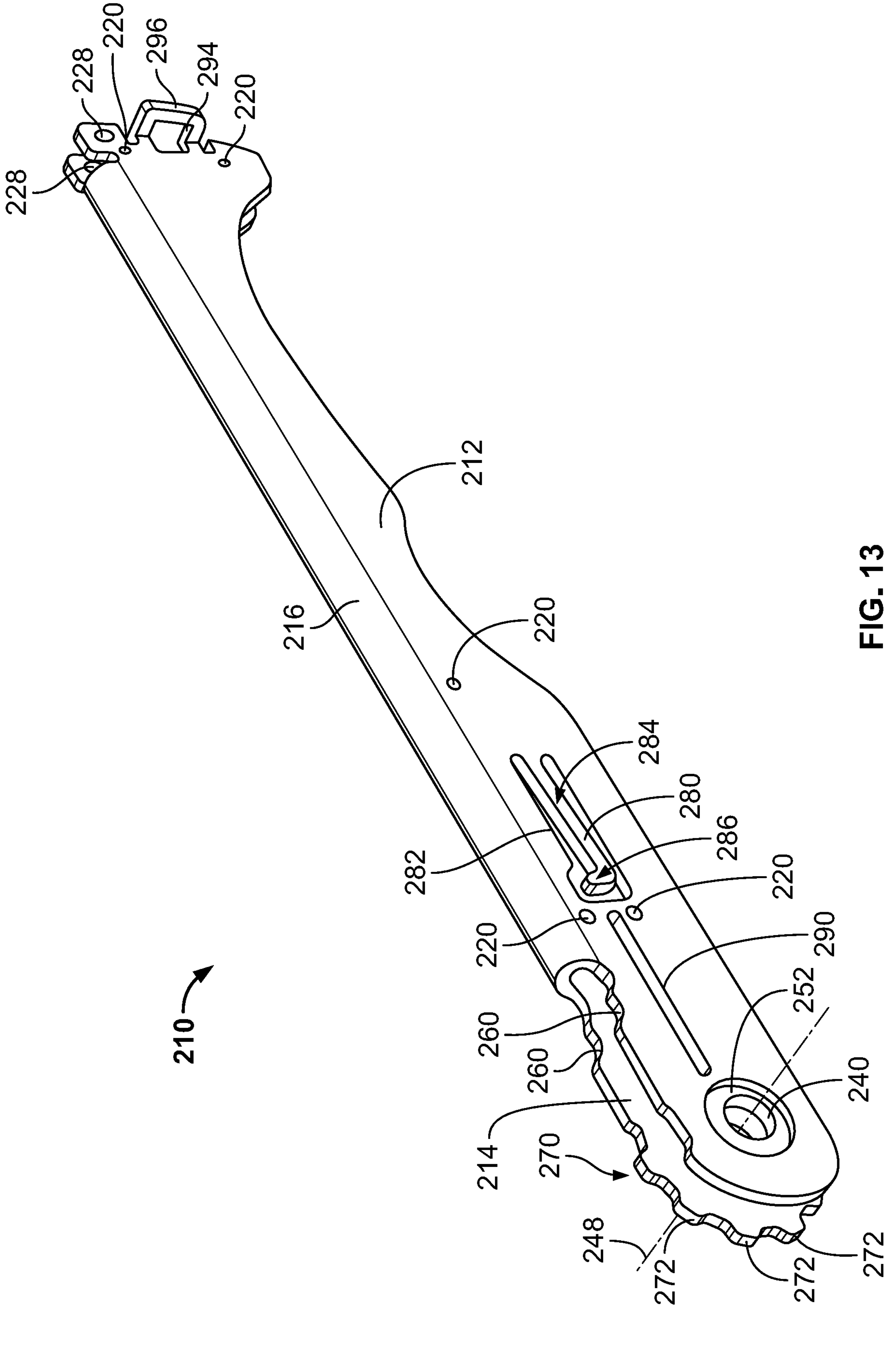
FIG. 13 is another perspective view of the frame of FIG. 12.
Figure 34A:
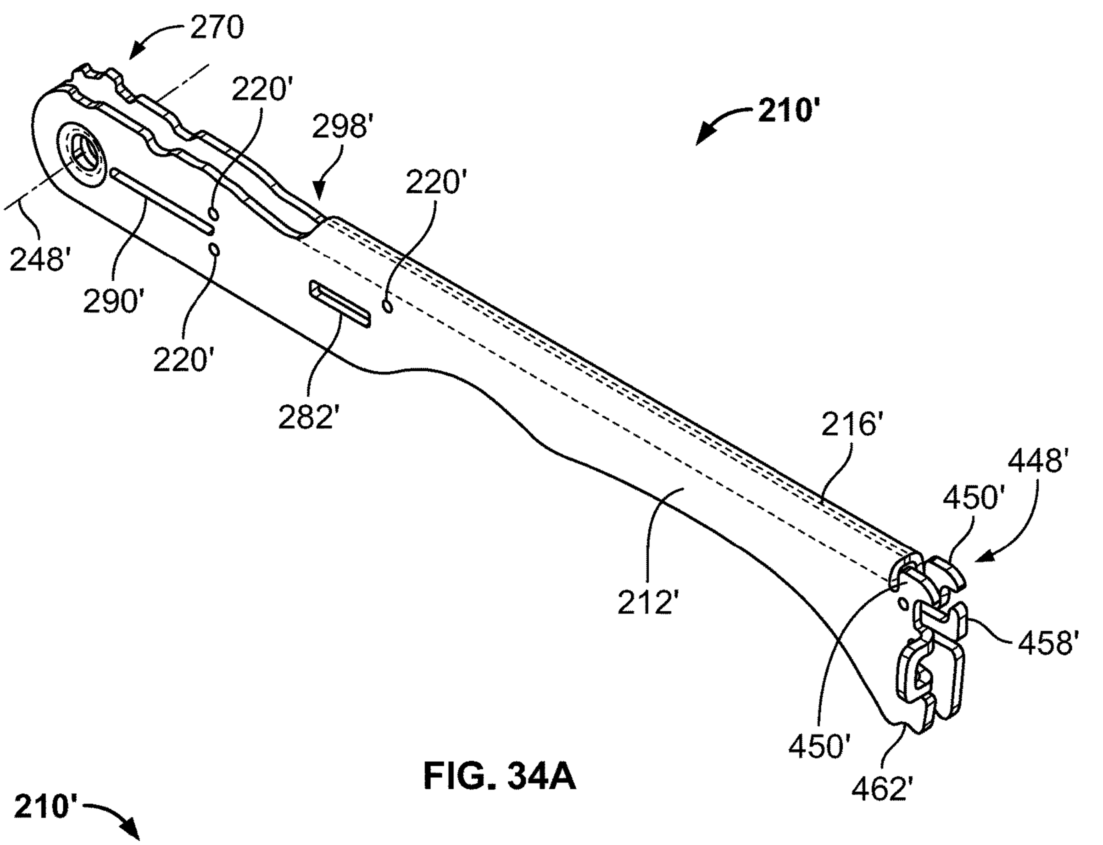
FIGS. 34A-34C are perspective and side views of a frame of a second handle of the folding machete of FIG. 25.
Figure 34B:
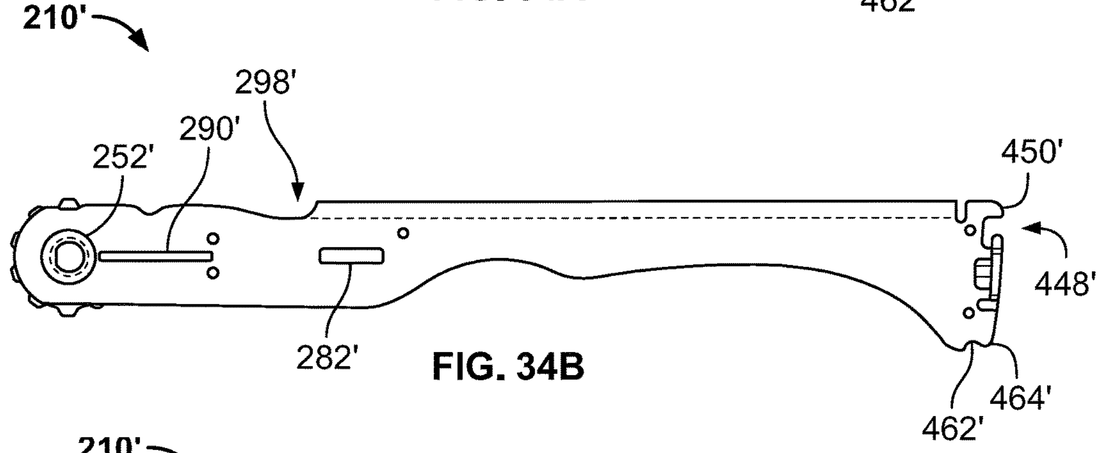
Figure 34C:
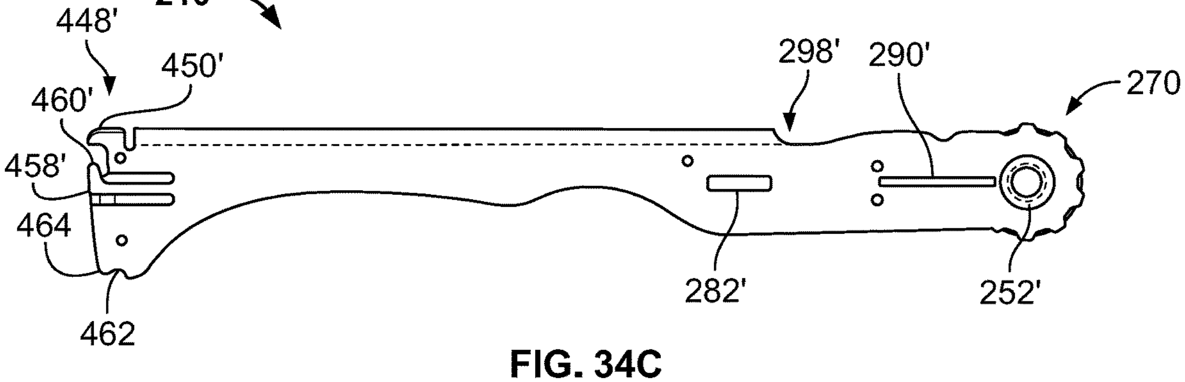
Figure 35A:
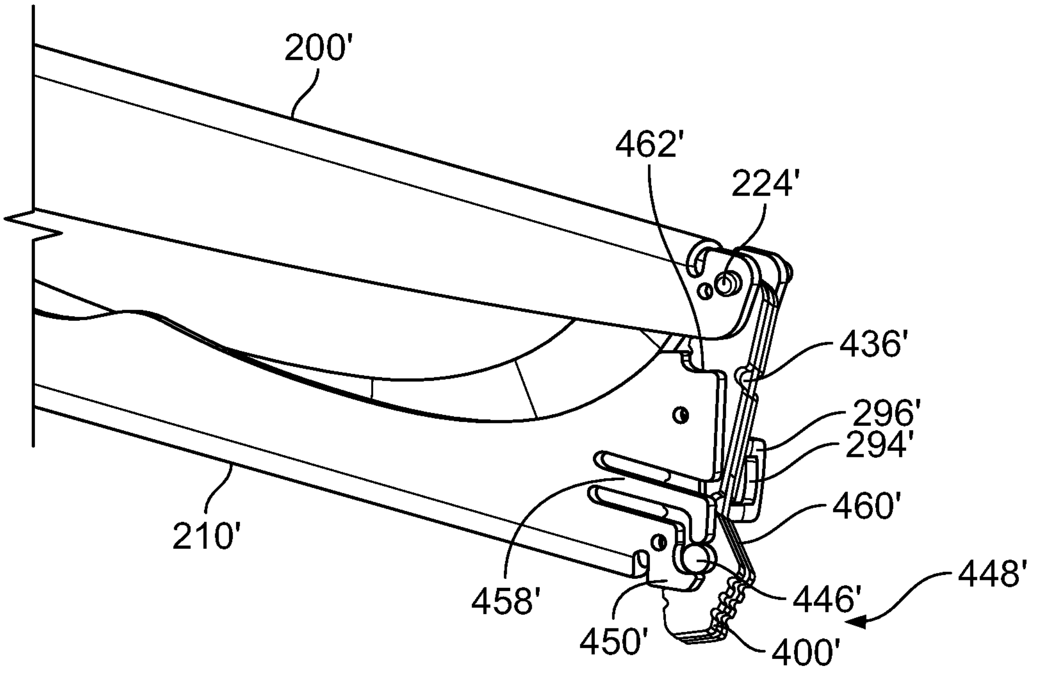
FIGS. 35A and 35B are detailed perspective views of the folding machete of FIG. 25 in a closed position, with a latch in a locked position and an unlocked position.
Figure 35B:
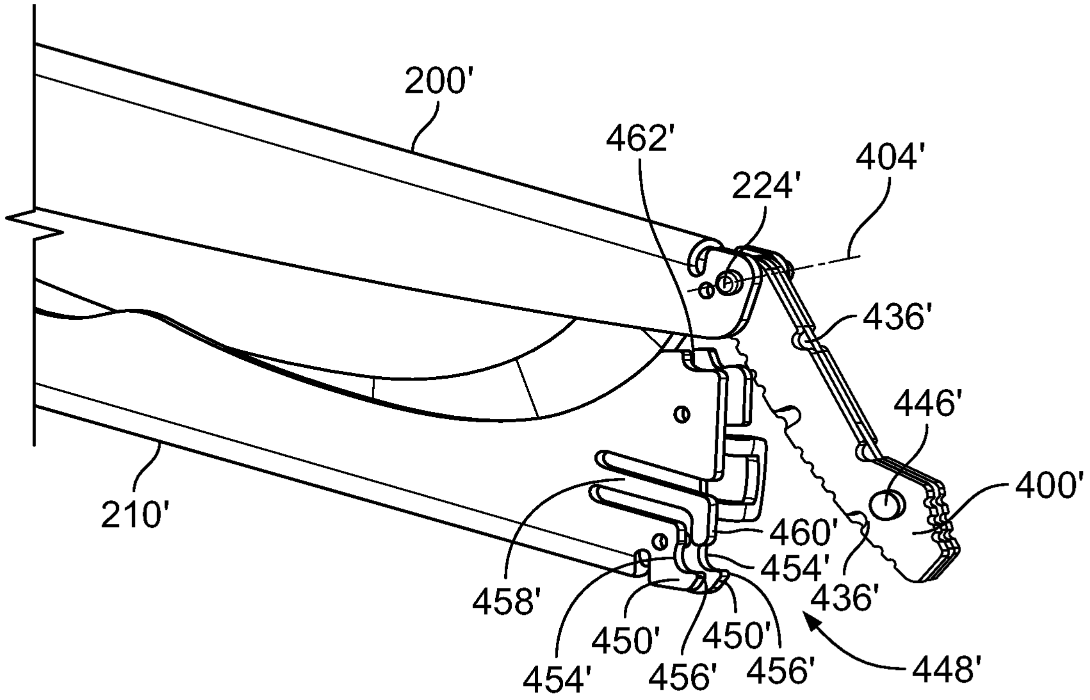

Referring to FIGS. 13 and 34A, the frame 210, 210' defines an aperture, shown as lanyard aperture 294, 294'. Specifically, a protrusion, shown as lanyard protrusion 296, 296' extends laterally outward from the plate 212, 212', away from the slot 108, 108'. The lanyard aperture 294, 294' is defined between the lanyard protrusion 296, 296' and the plate 212, 212'. A lanyard may extend through the lanyard aperture 294, 294' and tie around the lanyard protrusion 296, 296' to facilitate hanging the folding machete 100, 100' during transportation or storage.

Referring to FIGS. 6, 16-18, and 26, the folding machete 100, 100' further includes a pair of first bodies or covers, shown as top scales 300, 300', and a pair of second bodies or covers, shown as bottom scales 302, 302'. The top scales 300, 300' are coupled to the plate 202, 202' and the plate 204, 204', respectively, and the bottom scales 302, 302' are coupled to the plate 212, 212' and the plate 214, 214', respectively. The top scales 300, 300' and the bottom scales 302, 302' increase the overall width of the top handle 104, 104' and the bottom handle 106, 106' and have shaped and textured outer surfaces that facilitate a user comfortably and securely holding the folding machete 100, 100'. The top scales 300, 300' and the bottom scales 302, 302' define apertures, shown as mounting holes 310, 310'. The fasteners 222, 222' extend through the mounting holes 310, 310' and into the mounting holes 220, 220' to couple the top scales 300, 300' and the bottom scales 302, 302' to the frame 200, 200' and the frame 210, 210', respectively. To facilitate alignment, the top scales 300, 300' and the bottom scales 302, 302' each include a cylindrical protrusion 312. The cylindrical protrusions 312 are received within the circular depressions 252, 252'. The top scales 300, 300' and the bottom scales 302, 302' further define handle connection apertures 314 at the center of the cylindrical protrusions 312. The handle connection apertures 314 receive the outer sleeves 242, 242' and the fasteners 244, 244' therethrough. When the fasteners 244, 244' are tightened, the fasteners 244, 244' and the outer sleeves 242, 242' press against the top scales 300, 300' and the bottom scales 302, 302', preventing separation of the top scales 300, 300' and the bottom scales 302, 302' from the frame 200, 200' and the frame 210, 210'.

The top scales 300, 300' and the bottom scales 302, 302' further define recesses, shown as pin recesses 316, that extend partway through the top scales 300, 300' and the bottom scales 302, 302'. The pin recesses 316 receive the ends of the pivot pin 226, 226' and the latch pin 230 such that the top scales 300, 300' or the bottom scales 302, 302' engage the pivot pin 226, 226' and the latch pin 230. Because the pin recesses 316 do not extend through the entirety of the top scales 300, 300' and the bottom scales 302, 302', the pivot pin 226, 226' and the latch pin 230 are prevented from moving out of the frame 200, 200' or the frame 210, 210'. The top scales 300, 300' and the bottom scales 302, 302' further define recesses, shown as stop pin recesses 318. The stop pin recesses 318 are semicircular and arranged along a side of the top scales 300, 300' and the bottom scales 302, 302' such that the stop pin recesses 318 receive the stop pin 144, 144' when the top handle 104, 104' and the bottom handle 106, 106' are in the open positions. As the top handle 104, 104' and the bottom handle 106, 106' move toward the closed position, the stop pin 144, 144' passes out of the stop pin recesses 318. The top scales 300, 300' and the bottom scales 302, 302' each further define a first recess, shown as catch pin recess 320, an aperture, shown as catch aperture 322, 322', and a second recess, shown as catch recess 324. The pin recesses 316, the stop pin recesses 318, the catch pin recess 320, and the catch recesses 324 all extend laterally outward from an inside surface of the top scale 300, 300' or the bottom scale 302, 302'.

Referring to FIGS. 14-17, 19, 20, and 26-31B, the top handle 104, 104' and the bottom handle 106, 106' each further include a pair of levers or locking members, shown as catches 350, 350'. The catches 350, 350' include a first section 352, 352' and second section 354, 354'. Each catch 350, 350' defines an aperture, shown as pin aperture 356, 356', positioned between the first section 352, 352' and the second section 354, 354'. A protrusion, shown as locking protrusion 358, 358', extends away from the end of the first section 352, 352' opposite the second section 354, 354'.

Referring to FIGS. 14-17, 20, and 26-31B, the catches 350, 350' are each coupled to the frame 200, 200' or the frame 210, 210' by a pin, shown as catch pin 360, 360'. The catch pins 360, 360' extend though the pin aperture 356, 356' to pivotably couple the catch 350, 350' to the corresponding catch pin 360, 360'. The catches 350, 350' rotate about an axis of rotation 362, 362' that extends parallel to the catch pin 360, 360' and the pin aperture 356, 356'. The catch pins 360, 360' are received by the catch pin recesses 320, holding the catches 350, 350' in place relative to the frame 200, 200' and the frame 210, 210'. With the catch pins 360 (or catch pins 360', in folding machete 100') positioned within the catch pin recesses 320, the catches 350 are received within the catch recesses 324, and the second sections 354 of the catches 350 extend outward through the catch apertures 322, as demonstrated in FIGS. 1 and 2. In some embodiments, the vertical protrusions 286 of the spring tabs 280 engage the second sections 354, biasing the second sections 354 laterally outward, away from the slots 108, and through the catch apertures 322. The spring tabs 280 bias the catches 350 toward an engaged position.

Alternatively, the torsion springs 280' can engage the second sections 354', biasing the second sections 354 laterally outward, away from the slots 108', and through the catch apertures 322'. The rotational bias supplied by the torsion springs 280' urges the catches 350' inward, about the catch pin 360', toward an engaged position. A user may apply a force on the second section 354, 354' toward the slots 108, 108' to move or rotate the catches 350, 350' toward a disengaged position. The catches 350, 350' are located in the same longitudinal and vertical positions on the top handle 104, 104' and on the bottom handle 106, 106' such that a user can pinch the second sections 354, 354' toward one another to move the catches 350, 350' toward the disengaged positions.

Figure 22:
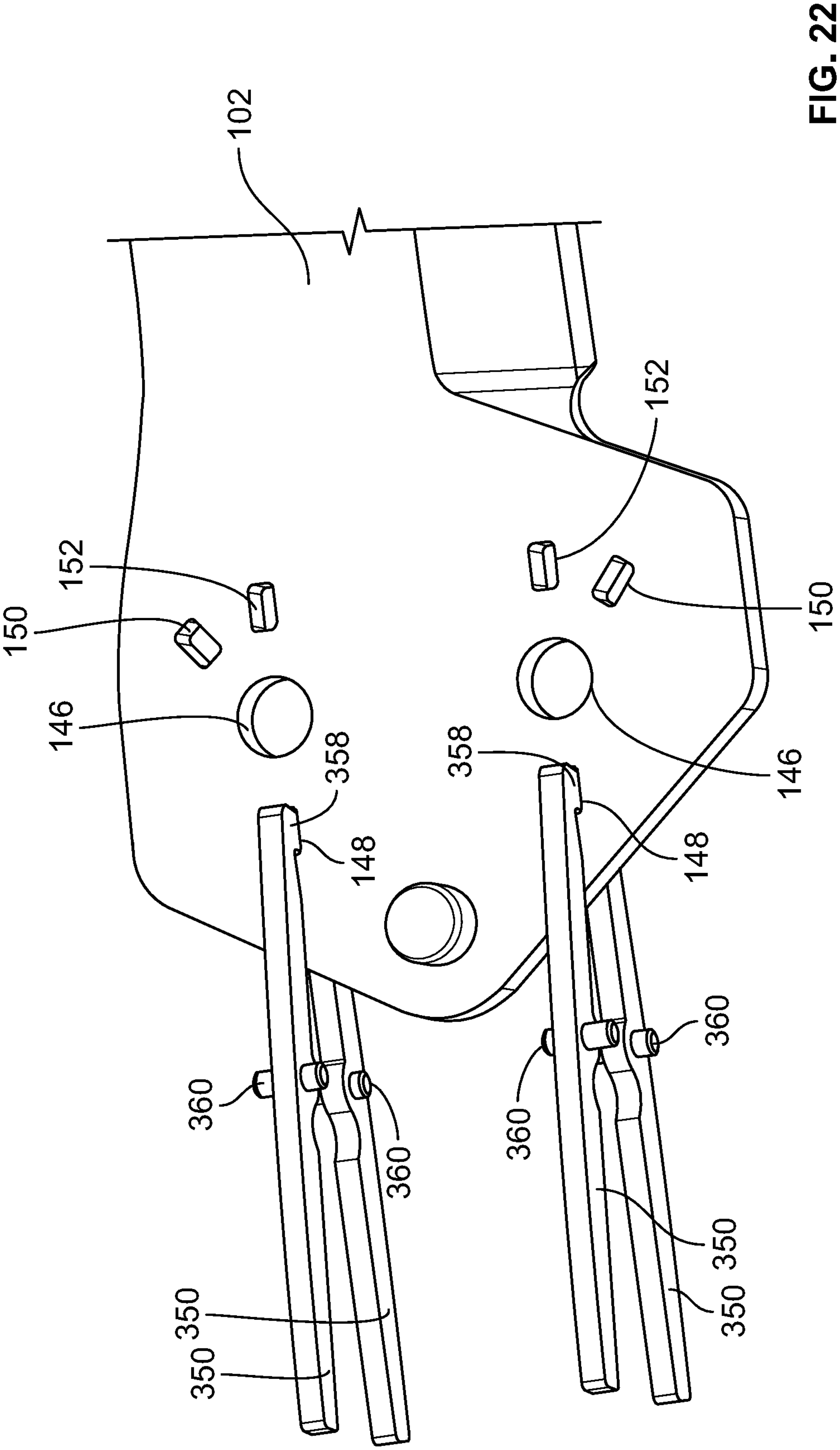
FIG. 22 is a perspective view of the catches of FIG. 19 engaging the blade of FIG. 7.
Figure 23:
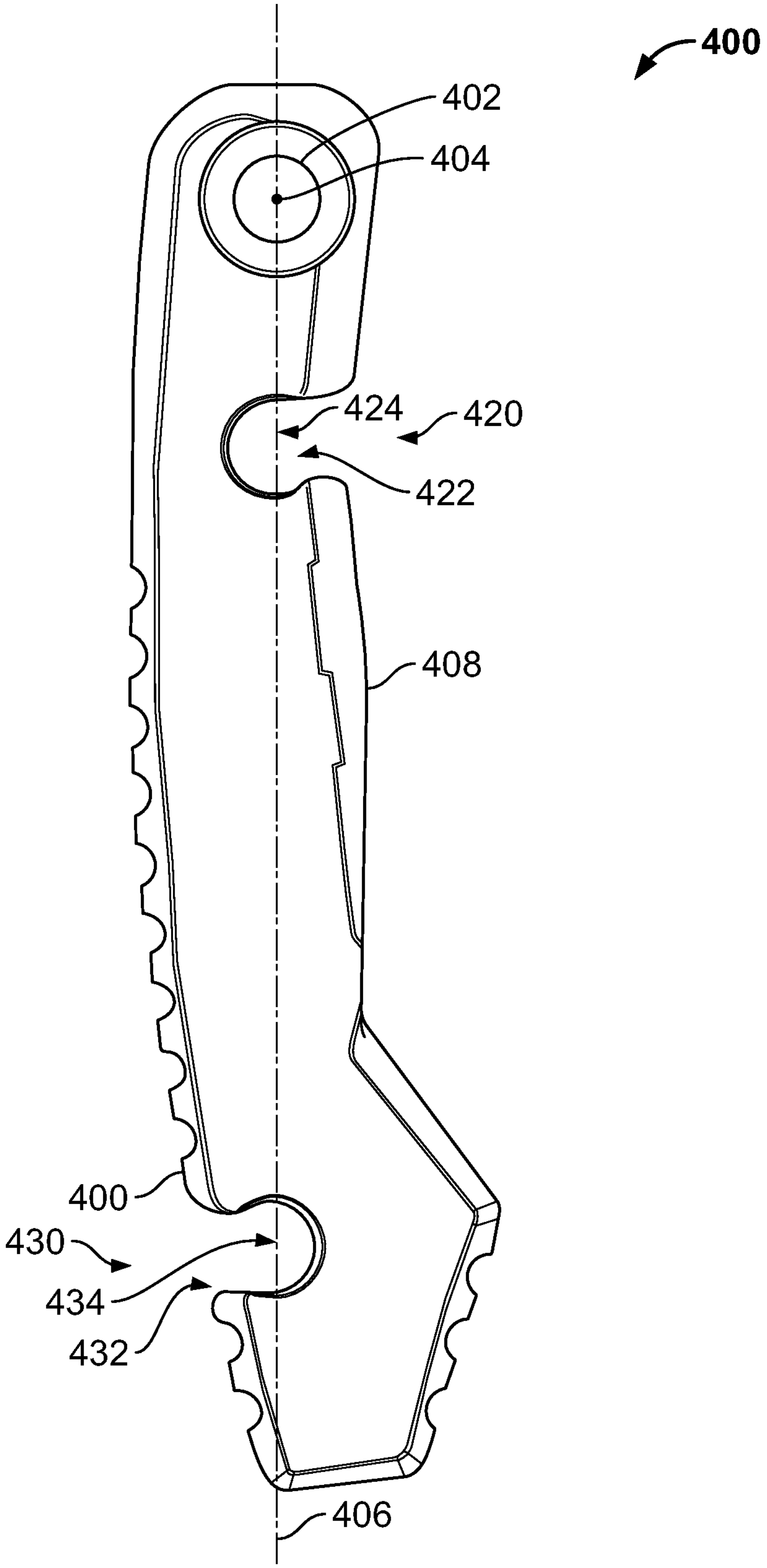
FIG. 23 is a side view of a latch of the folding machete of FIG. 1.
Figure 31A:
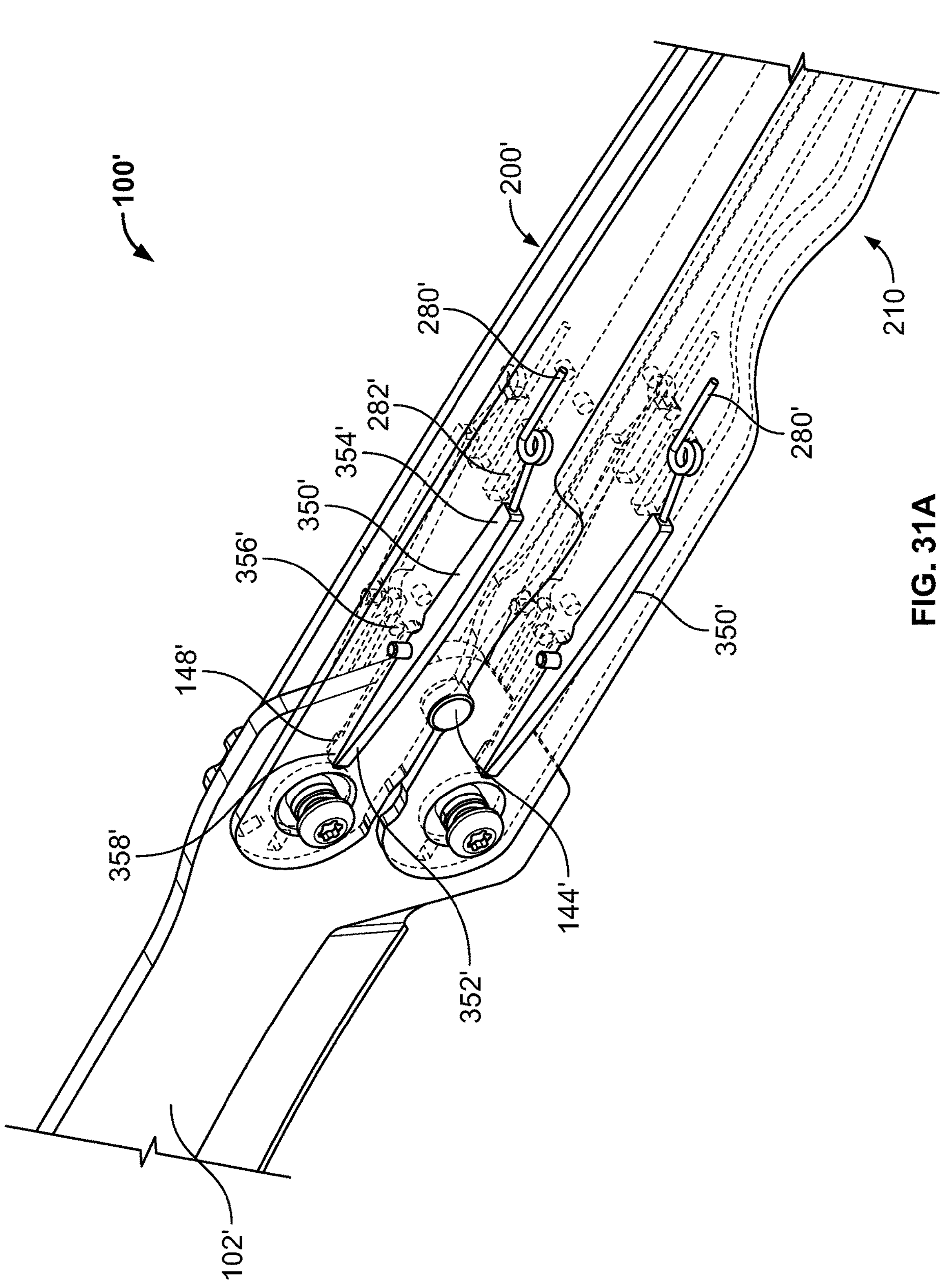
FIGS. 31A and 31B are a perspective views of a catch mechanism present in the folding machete of FIG. 25, with scales removed.
Figure 31B:
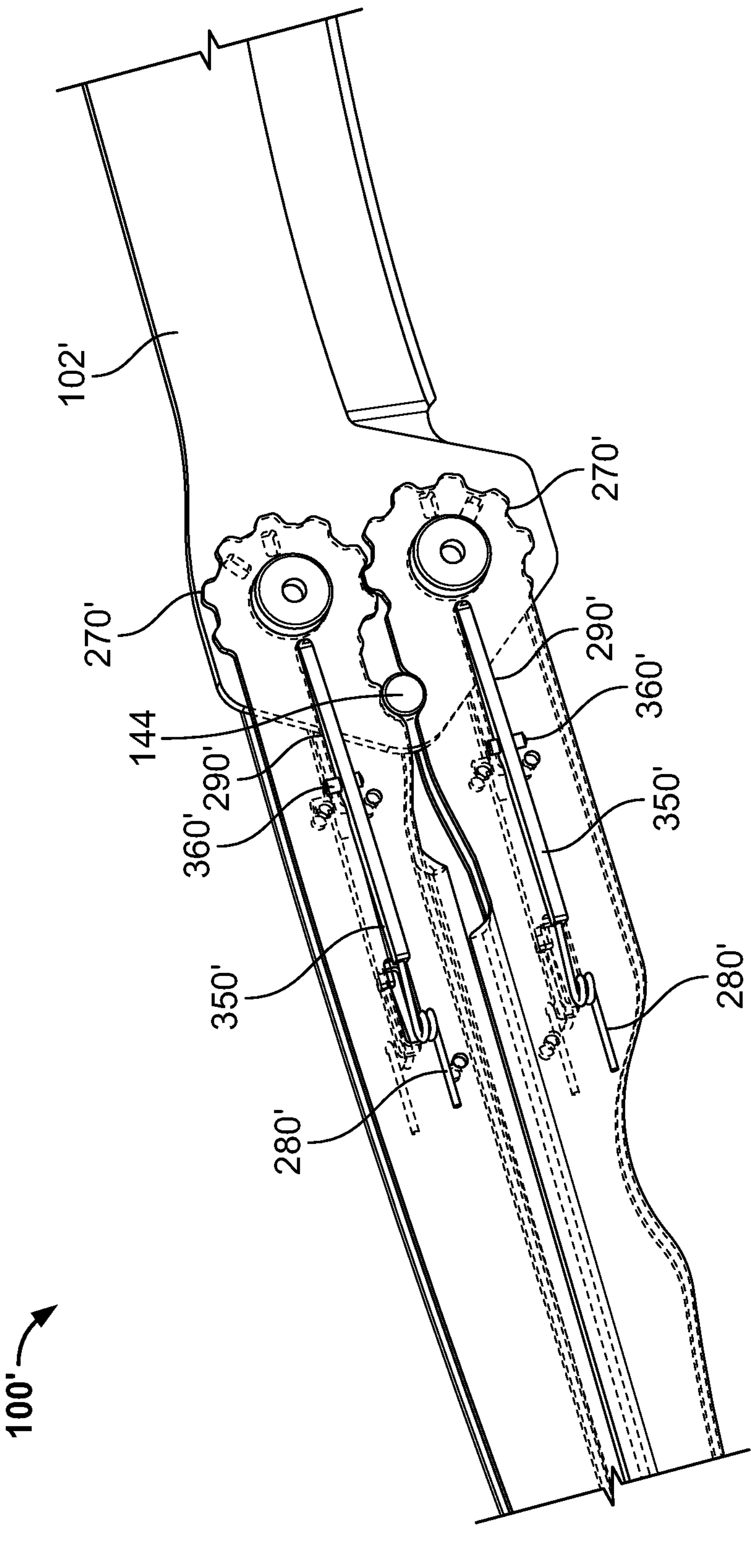

Referring to FIGS. 20, 21, 22, and 31A-31B, when the catches 350, 350' are in the engaged positions, the catches 350, 350' extend through the catch slots 290, 290' to engage the blade 102, 102'. When the top handle 104, 104' and the bottom handle 106, 106' are in the open position, the closed position, or an intermediate position between the open and closed positions, the catch slots 290, 290' align with the open position apertures 148, 148', the closed position apertures 152, 152', and the intermediate position apertures 150, 150', respectively. As shown in FIGS. 22 and 31A-31B, with the catches 350, 350' in the engaged positions, the locking protrusions 358, 358' extend into the open position apertures 148, 148', the closed position apertures 152, 152', or the intermediate position apertures 150, 150'. The locking protrusions 358, 358' engage the blade 102, 102', preventing relative rotation between the blade 102, 102', the top handle 104, 104', and the bottom handle 106, 106'. Because the biasing members 280, 280' bias the catches 350, 350' toward the engaged positions, the locking protrusions 358, 358' automatically engage the open position apertures 148, 148', the closed position apertures 152, 152', or the intermediate position apertures 150, 150' as the top handle 104, 104' and the bottom handle 106, 106' are rotated.

Figure 7:
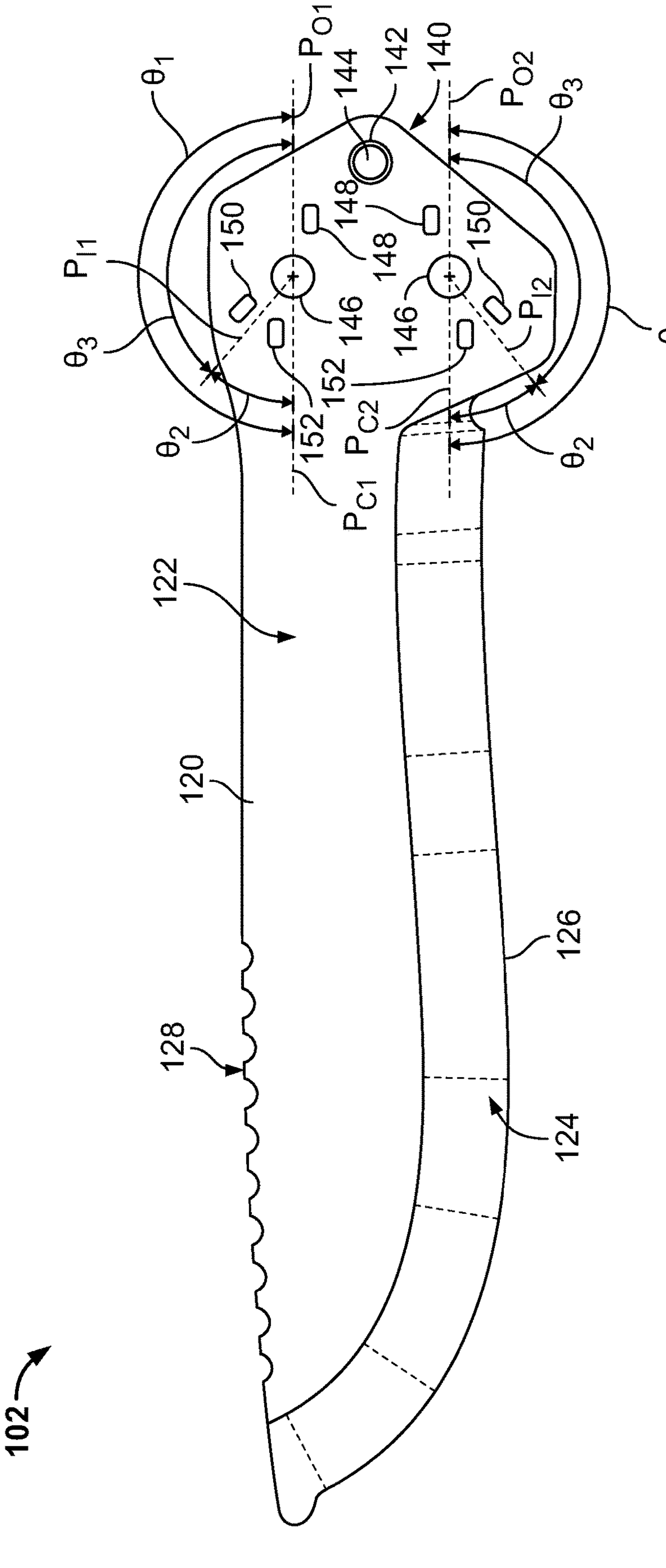
FIG. 7 is a side view of a blade of the folding machete of FIG. 1.
Figure 8:
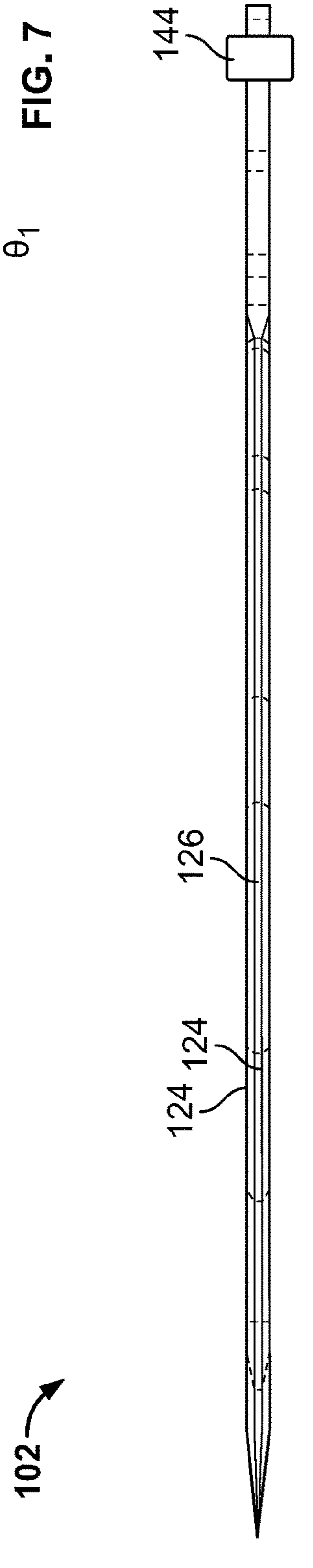
FIG. 8 is a bottom view of the blade of FIG. 7.
Figure 9:
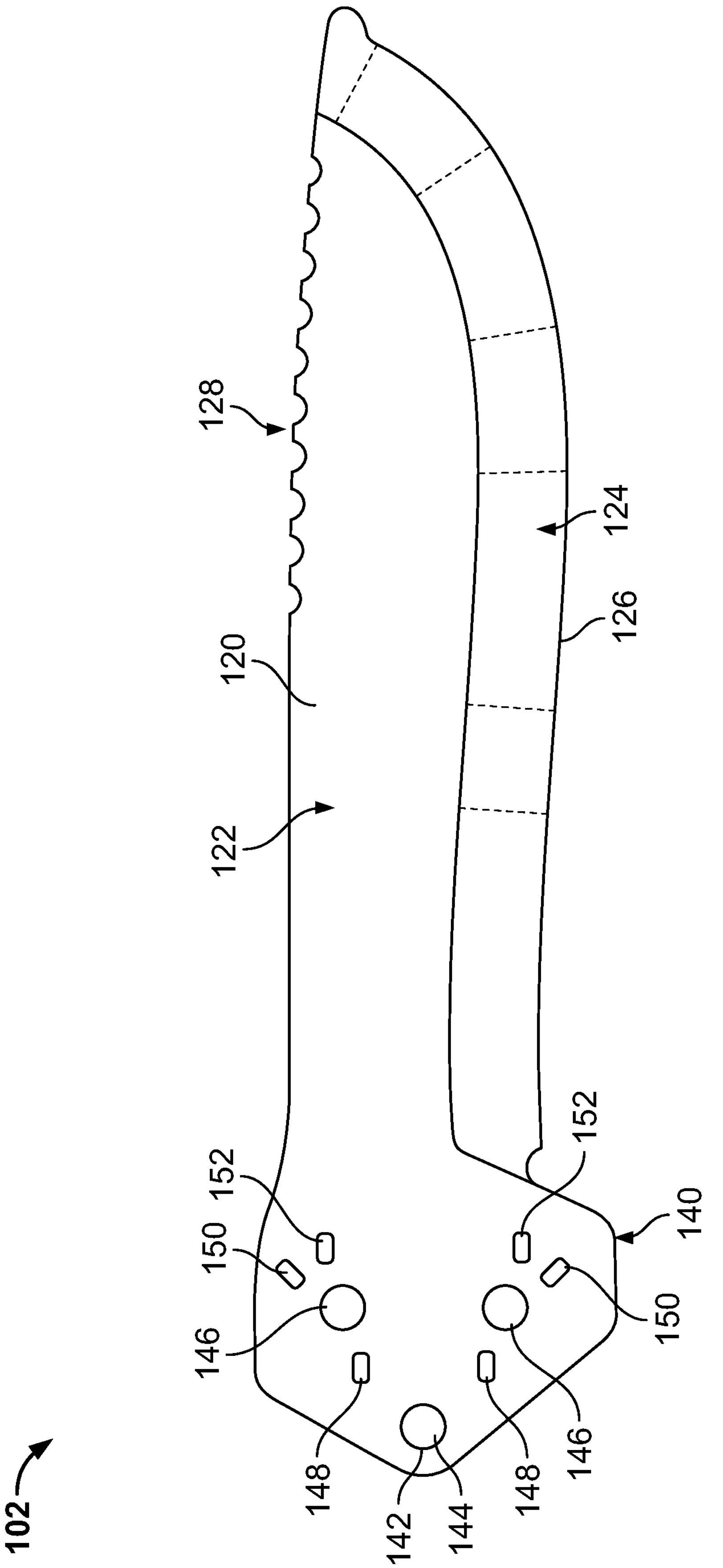
FIG. 9 is another side view of the blade of FIG. 7.
Figure 10:
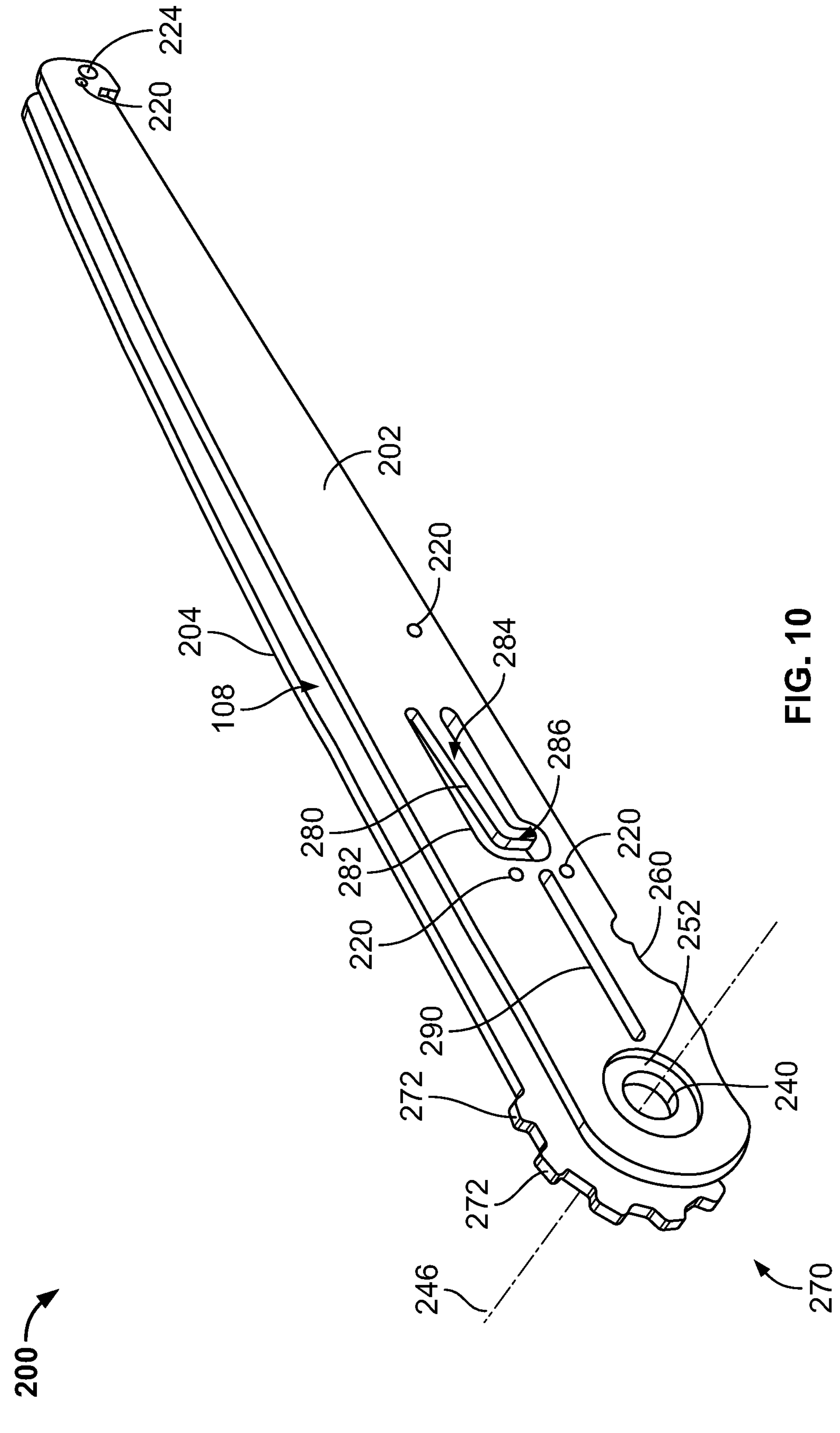
FIG. 10 is a perspective view of a frame of a first handle of the folding machete of FIG. 1.
Figure 11:
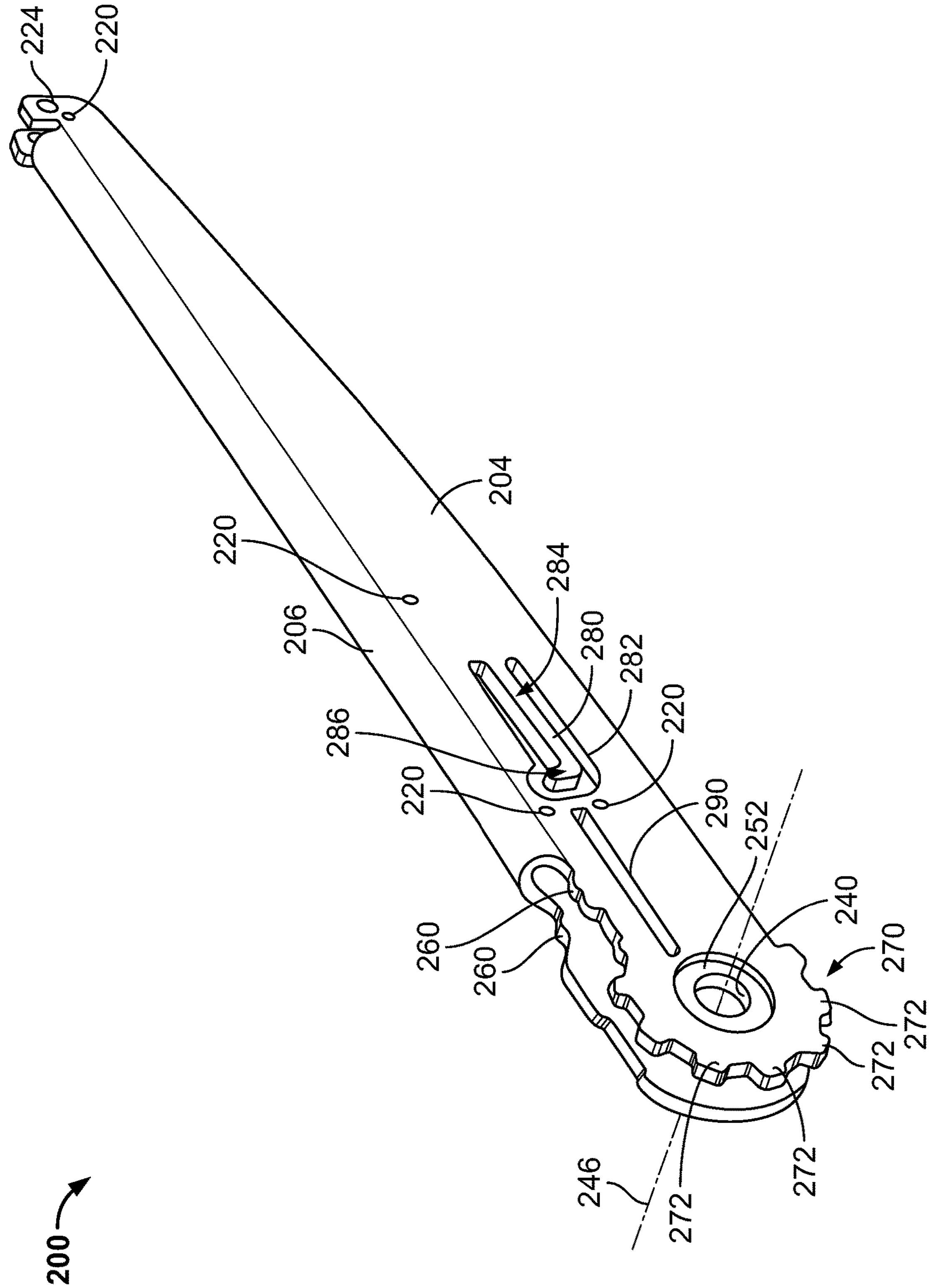
FIG. 11 is another perspective view of the frame of FIG. 10.
Figure 12:
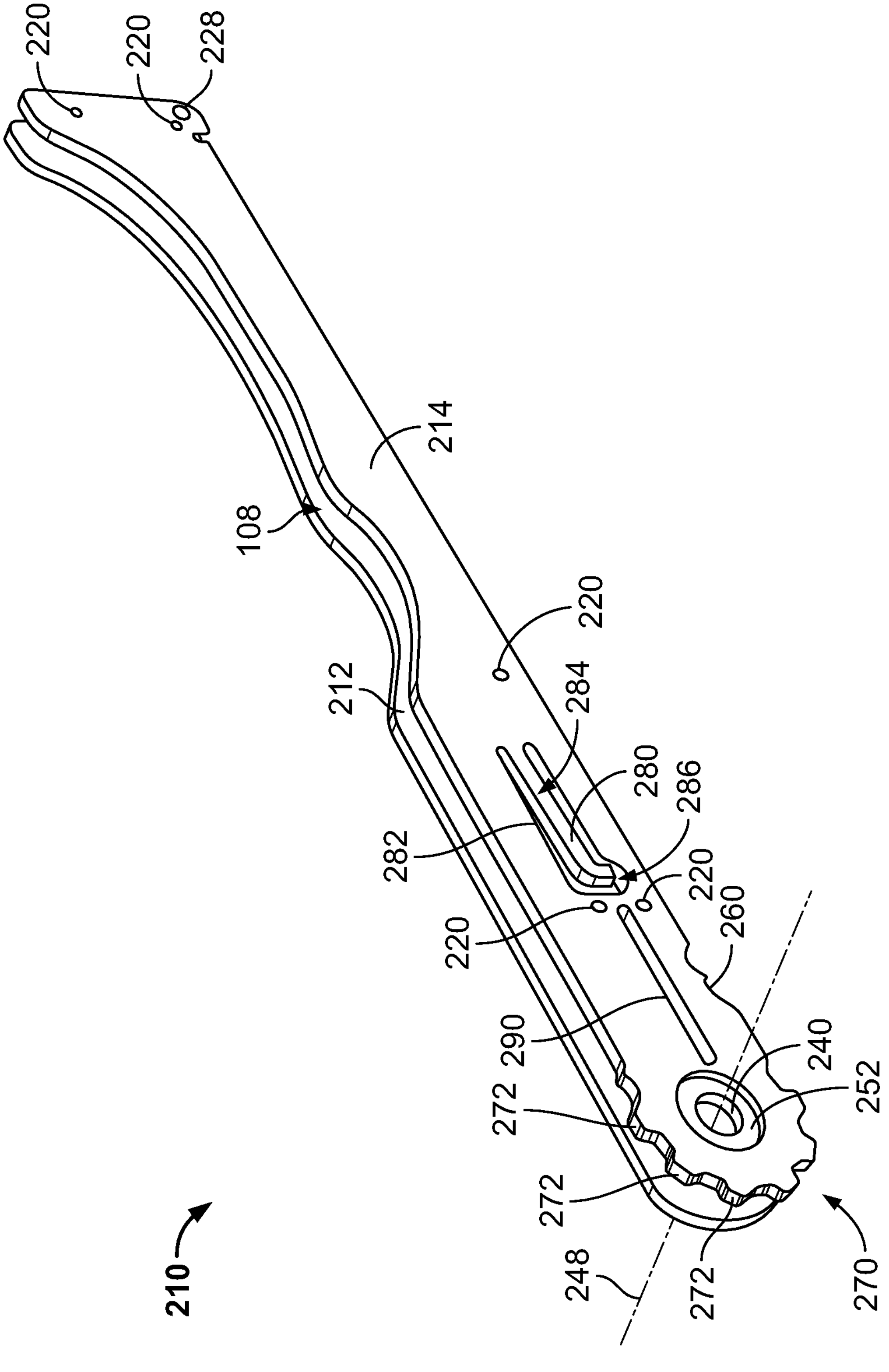
FIG. 12 is a perspective view of a frame of a second handle of the folding machete of FIG. 1.
Figure 32:
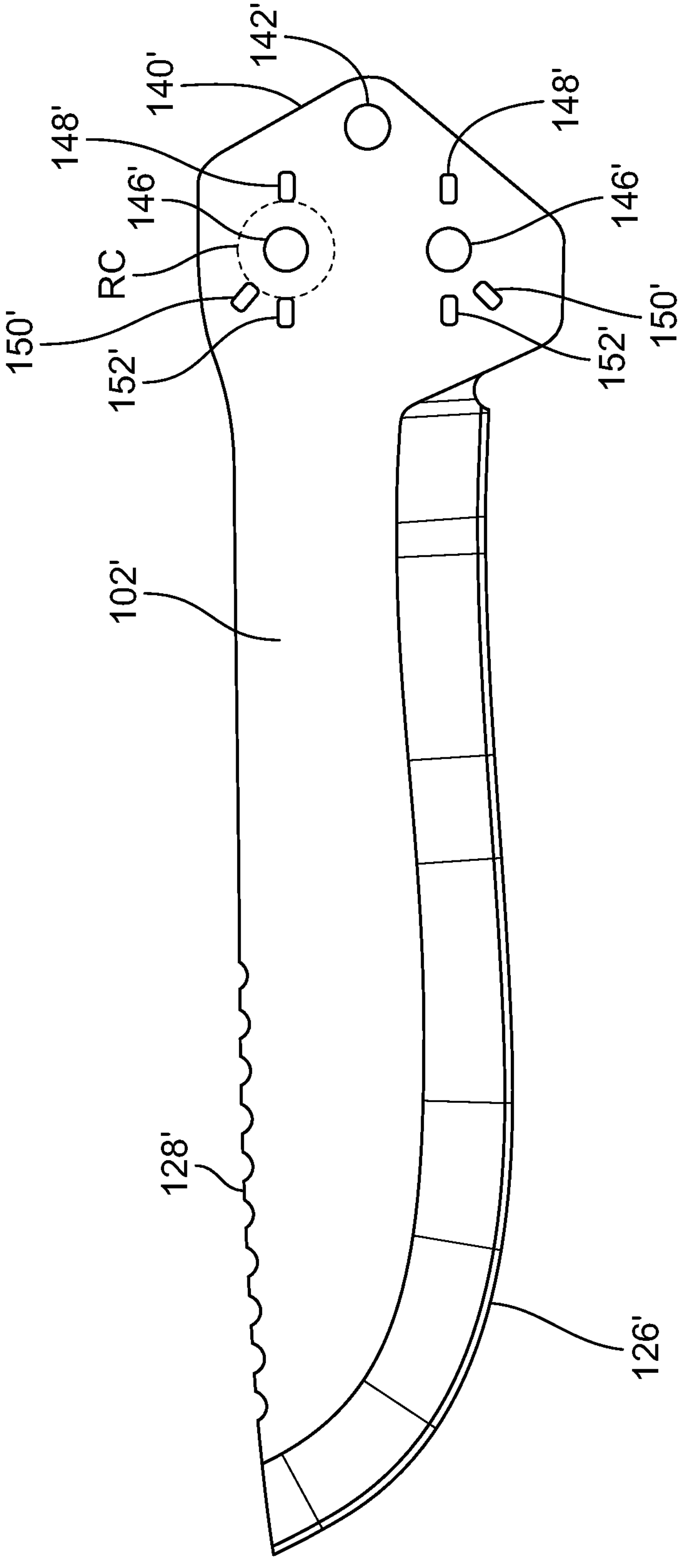
FIG. 32 is a side view of a blade of the folding machete of FIG. 25.
Figure 33A:
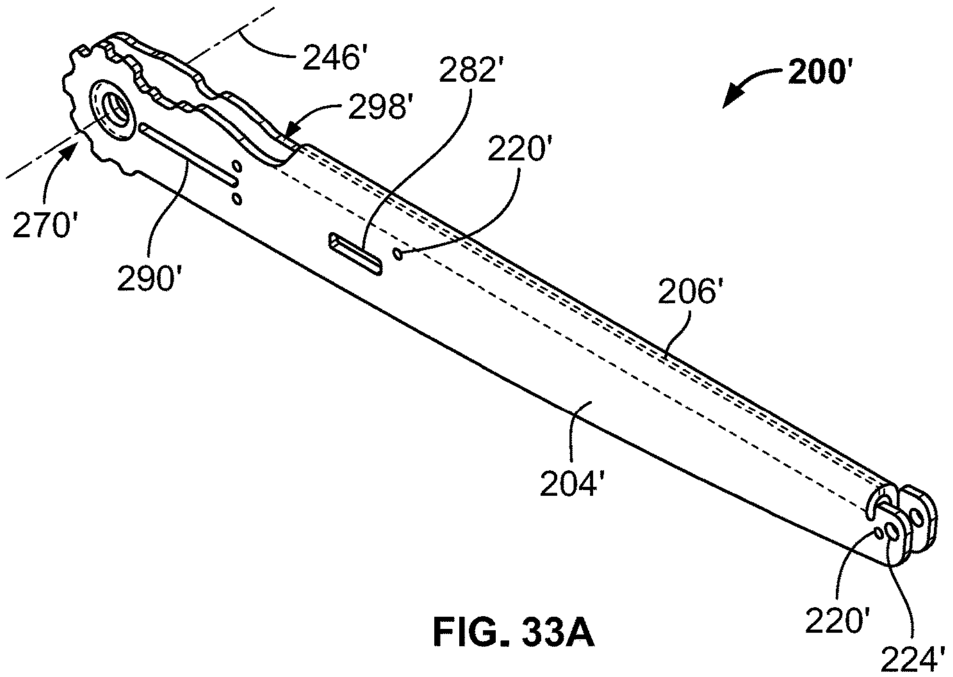
FIGS. 33A-33C are perspective and side views of a frame of a first handle of the folding machete of FIG. 25.
Figure 33B:
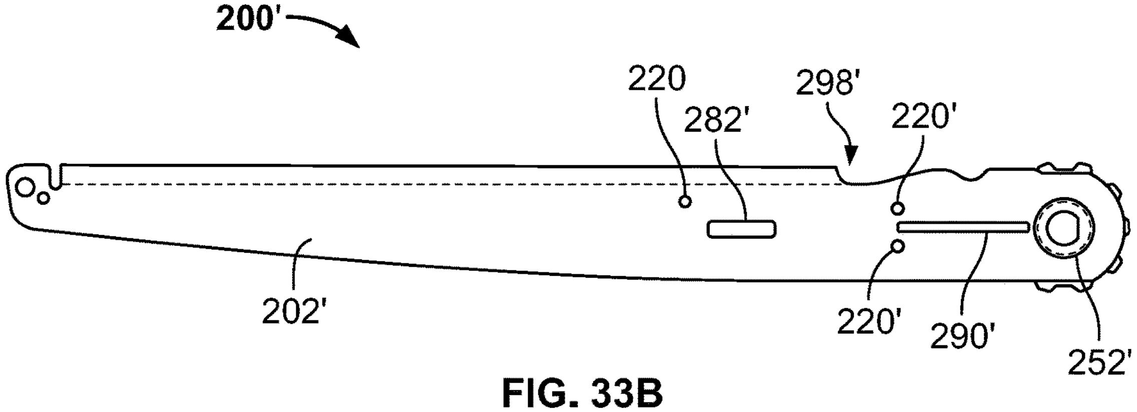
Figure 33C:
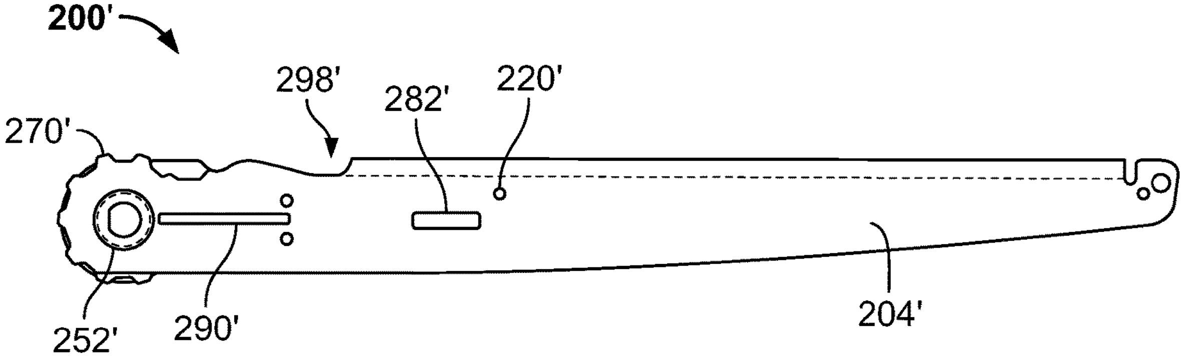

FIGS. 7 and 32 illustrate the open positions, closed positions, and intermediate positions of the top handle 104, 104' and the bottom handle 106, 106'. The locations of the open positions, closed positions, and intermediate positions are based on the positions of the open position aperture 148, 148', the intermediate position aperture 150, 150', and the closed position aperture 152, 152'. In some embodiments, the top handle 104 extends along axis $P_{C1}$ in the closed position, along the axis $P_{11}$ in the intermediate position, and along the axis $P_{O1}$ in the open position. The bottom handle 106 extends along axis $P_{C2}$ in the closed position, along the axis $P_{12}$ in the intermediate position, and along the axis $P_{O2}$ in the open position. For both the top handle 104 and the bottom handle 106, the open position is angularly offset from the closed position by a first angle $\theta_1$, the closed position is angularly offset from the intermediate position by a second angle $\theta_2$, and the open position is angularly offset from the intermediate position by a third angle $\theta_3$. The angle $\theta_1$ is approximately 180 degrees. Accordingly, as shown, the open and closed positions of the top handle 104 and the bottom handle 106 are substantially parallel. In other embodiments, the angle $\theta_1$ is less than 180 degrees. The angle $\theta_2$ is less than the angle $\theta_3$ (e.g., 15 degrees, 30 degrees, 45 degrees, 60 degrees, etc.).

The locations of the positioning apertures 148', 150', 152' can be adjusted to accommodate for differently-sized handles 104', 106' as well. As depicted in FIG. 32, each positioning aperture 148', 150', 152' is spaced, equidistantly, from one of the connection apertures 146'. Each aperture 148', 150', 152' can be positioned about and extend away from a reference circle RC concentric with the connection apertures 146'. In some embodiments, the open position apertures 148' and the closed position apertures 152' are aligned with one another to extend coaxially away from the nearby connection aperture 146'. Accordingly, the open position apertures 148' and the closed position apertures 152' are positioned 180 degrees apart from one another on the reference circle RC. Additionally or alternatively, the blade 102' can defined by the various angular and axial relationships described above with respect to the blade 102 in the folding machete 100.

In operation, a user may use the folding machete 100, 100' with the top handle 104, 104' and the bottom handle 106, 106' in the open positions. In this configuration, the catches 350, 350' hold the top handle 104, 104' and the bottom handle 106, 106' in place. When the user is done operating the folding machete 100, 100', they may press all of the catches 350, 350' toward the disengaged positions. The user may then apply a torque to one or both of the top handle 104, 104' and the bottom handle 106, 106' to rotate the top handle 104, 104' and the bottom handle 106, 106' toward the closed positions. The user may choose to apply the torque to only one of the top handle 104, 104' and the bottom handle 106, 106', as the gears 270, 270' cause the top handle 104, 104' and the bottom handle 106, 106' to rotate in unison. Once the top handle 104, 104' and the bottom handle 106, 106' are out of the open positions, the user may release the catches 350, 350', which then engage the flat portions 122, 122' of the main surface 120, 120' of the blade 102, 102'. Once the top handle 104, 104' and the bottom handle 106, 106' reach the intermediate position, the biasing members 280, 280' rotate the catches 350, 350' into the engaged positions, forcing the protrusions 258, 258' into the intermediate position apertures 150, 150'. As shown in FIGS. 7 and 32, the intermediate position apertures 150, 150' are closer to the closed position apertures 152, 152' than the open position apertures 148, 148'. Accordingly, the top handle 104, 104' and the bottom handle 106, 106' are closer to the closed position than to the open position when in the intermediate position. The intermediate position facilitates stopping the top handle 104, 104' and the bottom handle 106, 106' near the closed position, providing the user with an opportunity to readjust their grip on the top handle 104, 104' and/or the bottom handle 106, 106'. The intermediate position prevents the user from accidentally pinching their fingers between the blade 102, 102' and the top handle 104, 104' or the bottom handle 106, 106'.

To move from the intermediate position to the closed positions, the user may again press all of the catches 350, 350' toward the disengaged positions. The user may then apply a torque to one or both of the top handle 104, 104' and the bottom handle 106, 106' to rotate the top handle 104, 104' and the bottom handle 106, 106' toward the closed positions. Once the top handle 104, 104' and the bottom handle 106, 106' are out of the intermediate positions, the user may release the catches 350, 350', which then engage the flat portions 122, 122' of the main surface 120, 120' of the blade 102, 102'. Once the top handle 104, 104' and the bottom handle 106, 106' reach the closed positions, the biasing members 280, 280' rotate the catches 350, 350' into the engaged positions, forcing the protrusions 258, 258' into the closed position apertures 152, 152', holding the top handle 104, 104' and the bottom handle 106, 106' in the closed positions. To again reach the open position, the user may complete this process again in reverse order.

Referring to FIGS. 1, 5, 6, 23, 24, 26, and 35A-37B, the folding machete 100, 100' further includes a locking member, shown as latch 400, 400'. The latch 400, 400' defines an aperture, shown as pin aperture 402, 402'. The pin aperture 402, 402' is configured to receive the pivot pin 226, 226', thereby pivotably coupling the latch 400, 400' to the frame 200, 200'. The latch 400, 400' is received within the slots 108, 108' of the top handle 104, 104' and the bottom handle 106, 106' near the distal end portions 112, 112'. The latch 400, 400' is configured to rotate about an axis of rotation 404, 404' relative to the frame 200, 200' that extends laterally. The latch 400, 400' extends away from the axis of rotation 404, 404' about an axis of extension 406, 406'. The axis of extension 406, 406' extends perpendicular to the axis of rotation 404, 404'. A first surface of the latch 400, 400', shown as first side 408, 408', extends on a first side of the axis of extension 406, 406', and a second surface of the latch 400, 400', shown as second side 410, 410', extends on an opposite side of the axis of extension 406, 406'.

In some embodiments, the latch 400 defines a first recess, groove, notch, or slot, shown as open position groove 420. The open position groove 420 extends toward the axis of extension 406 from the first side 408 (e.g., extends laterally outward from the axis of extension 406). The open position groove 420 has a first section 422 that is nearest the first side 408 (e.g., defines the opening to the open position groove 420) and a second section 424 that is positioned farther from the first side 408. Accordingly, the first section 422 is positioned between the first side 408 and the second section 424. The first section 422 has a first width, and the second section 424 has a second width greater than the first width. The first width is less than the thickness (e.g., diameter) of the latch pin 230.

The latch 400 can define a second recess, groove, notch, or slot, shown as closed position groove 430. The closed position groove 430 extends toward the axis of extension 406 from the second side 410 (e.g., extends laterally outward from the axis of extension 406). The closed position groove 430 has a first section 432 that is nearest the second side 410 (e.g., defines the opening to the closed position groove 430) and a second section 434 that is positioned farther from the second side 410. Accordingly, the first section 432 is positioned between the second side 410 and the second section 434. As such, the open position groove 420 and the closed position groove 430 extend in substantially opposite directions. The first section 432 has a third width, and the second section 424 has a fourth width greater than the third width. The third width is less than the thickness (e.g., diameter) of the latch pin 230. The first width may be substantially equal to the third width, and the second width may be substantially equal to the fourth width.

Figure 24:
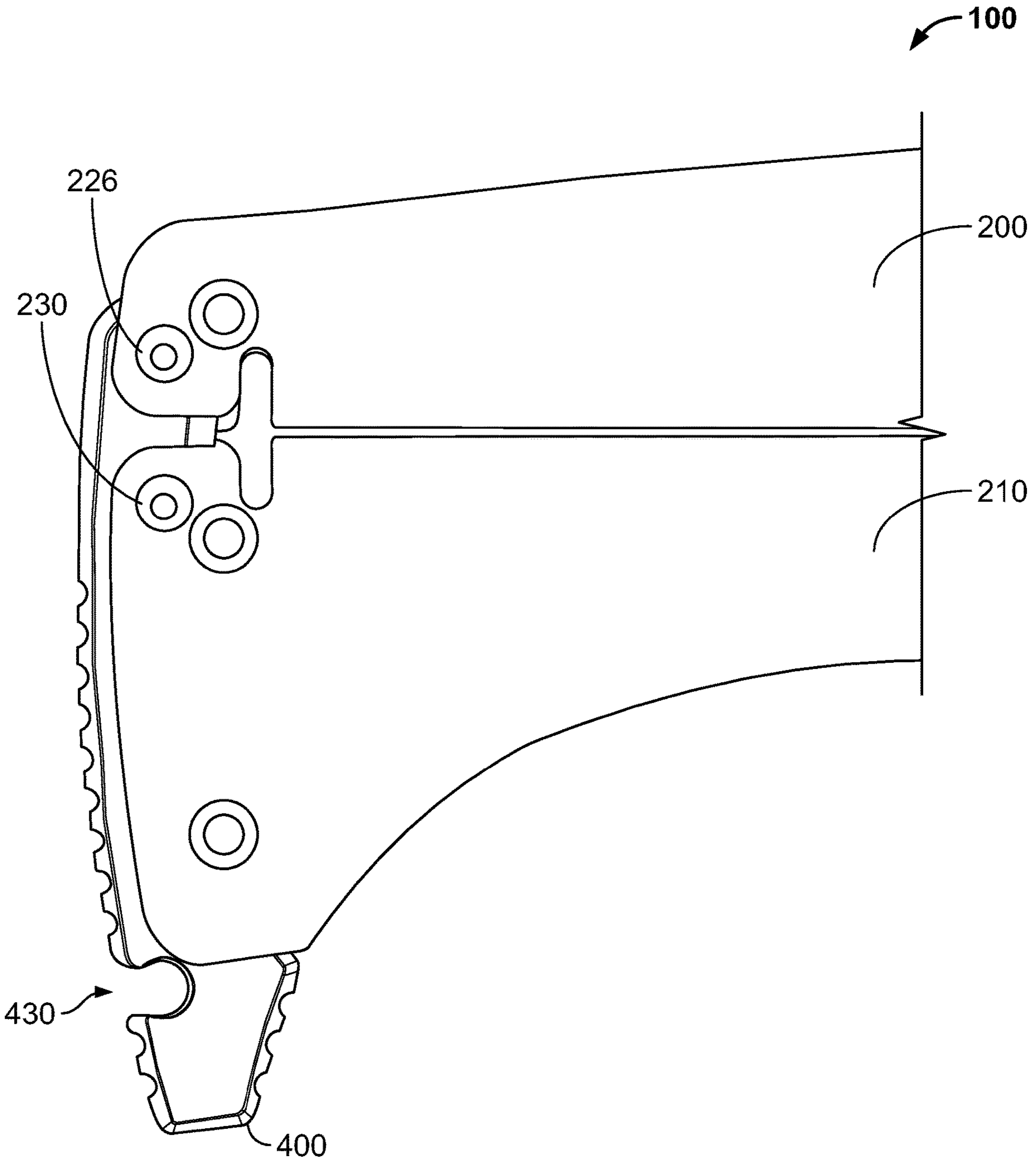
FIG. 24 is a side view of the folding machete of FIG. 1 with the scales of FIG. 16 removed.
Figure 25:
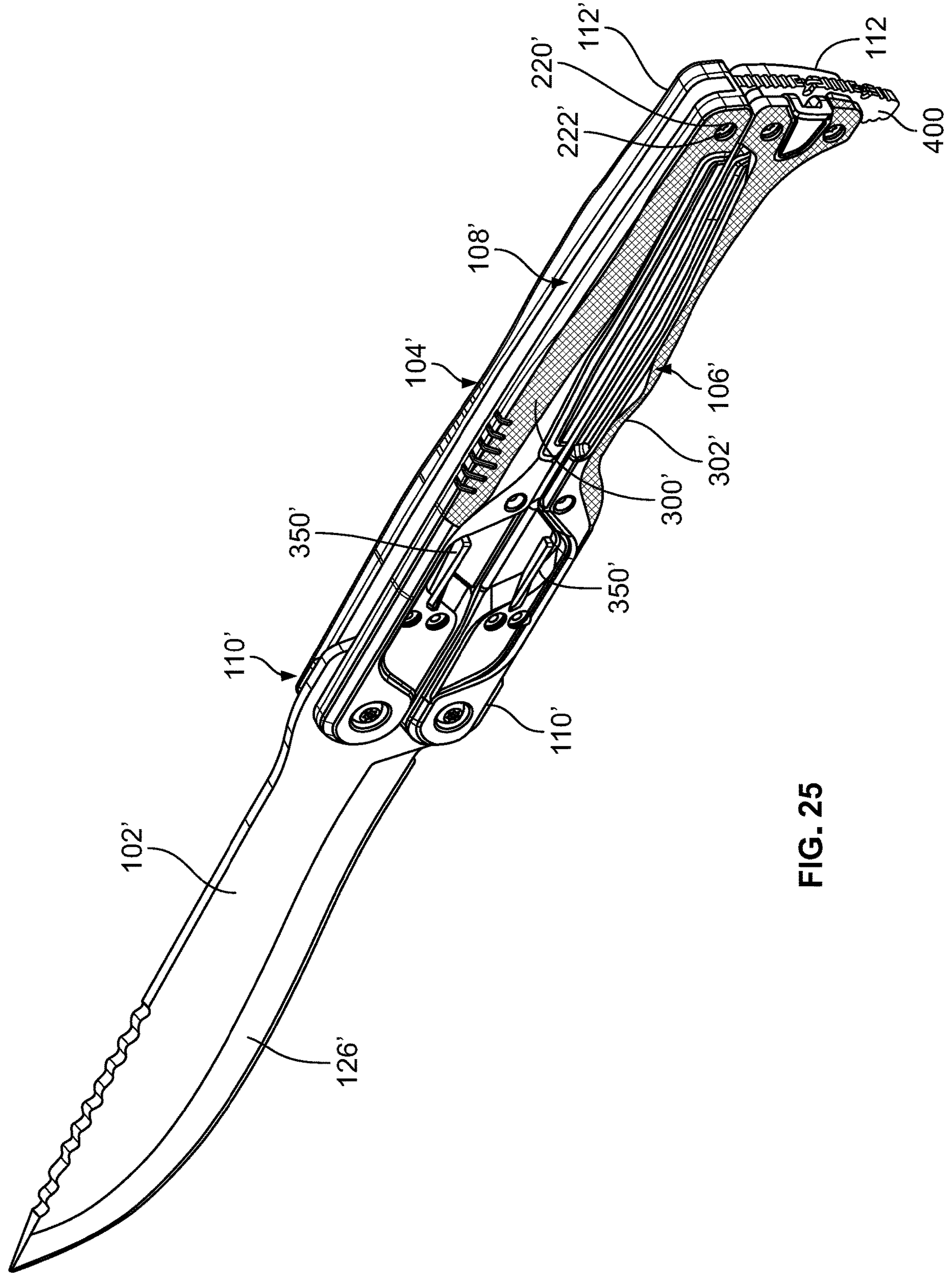
FIG. 25 is a perspective view of a folding machete, according to another exemplary embodiment.
Figure 26:
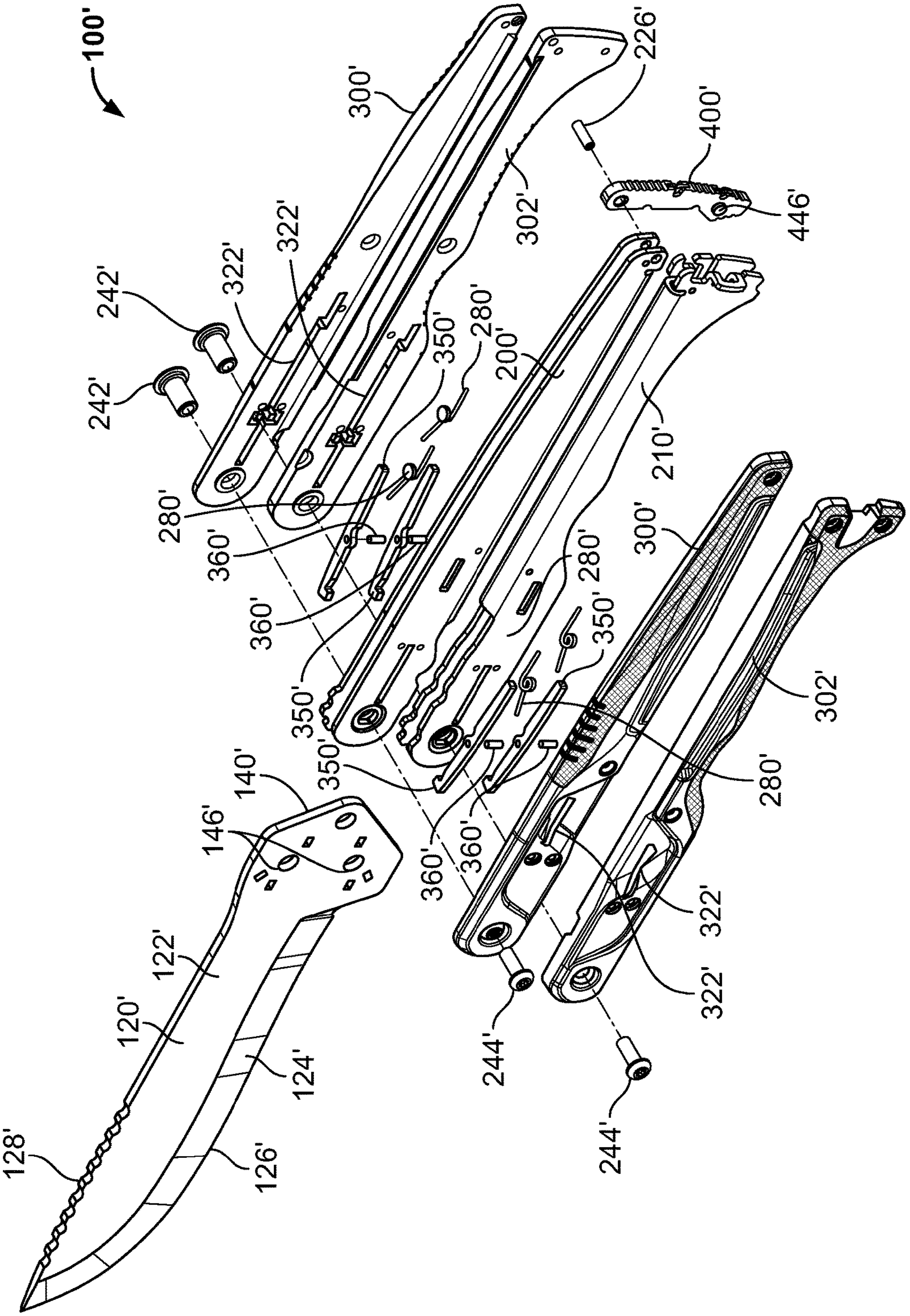
FIG. 26 is an exploded view of the folding machete of FIG. 25.
Figures 27A, 27B, 27C, 27D:
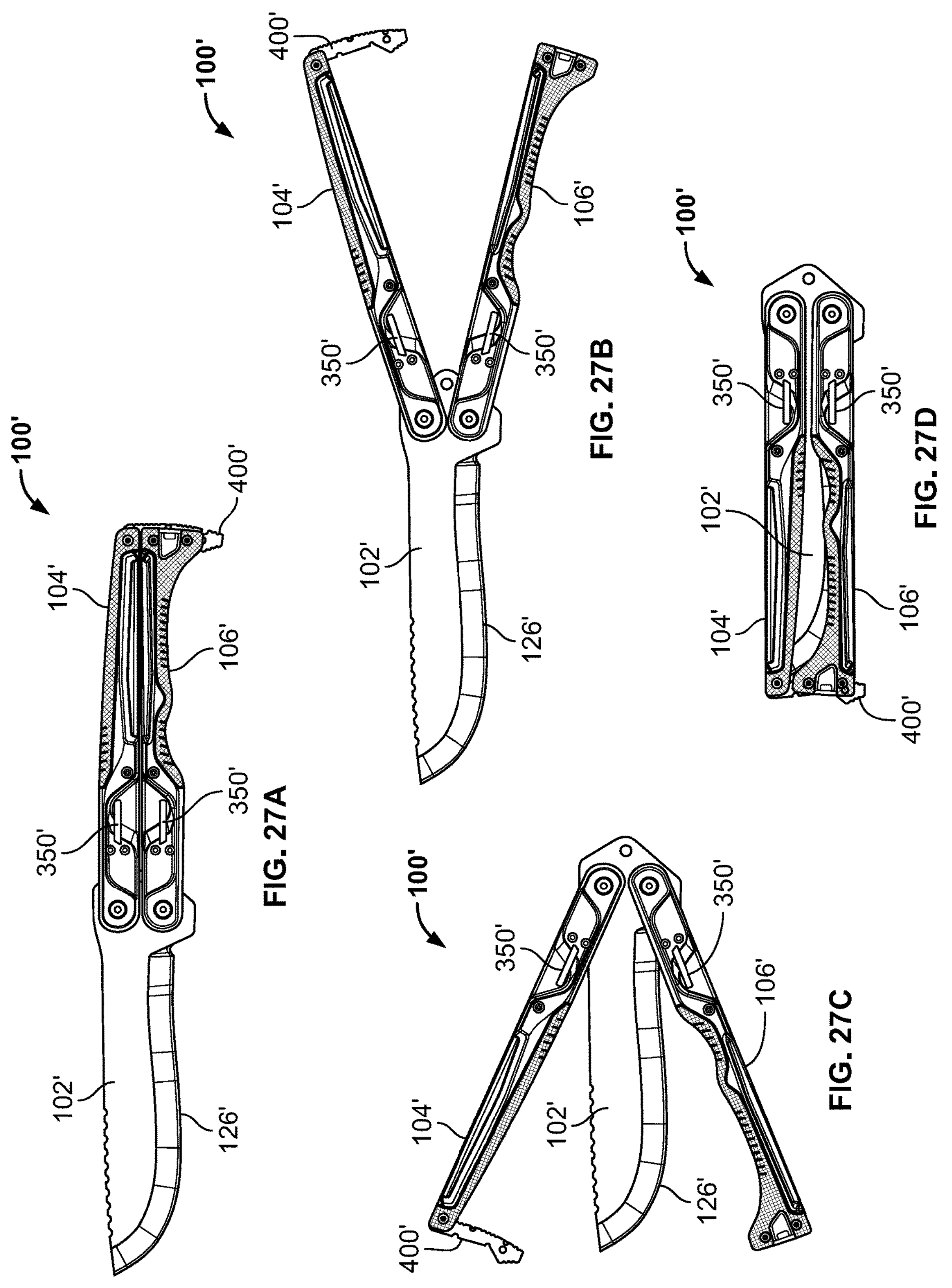
FIGS. 27A-27D are side views of the folding machete of FIG. 25, shown in an open position, a first intermediate position, a second intermediate position, and a closed position.
Figure 28A:
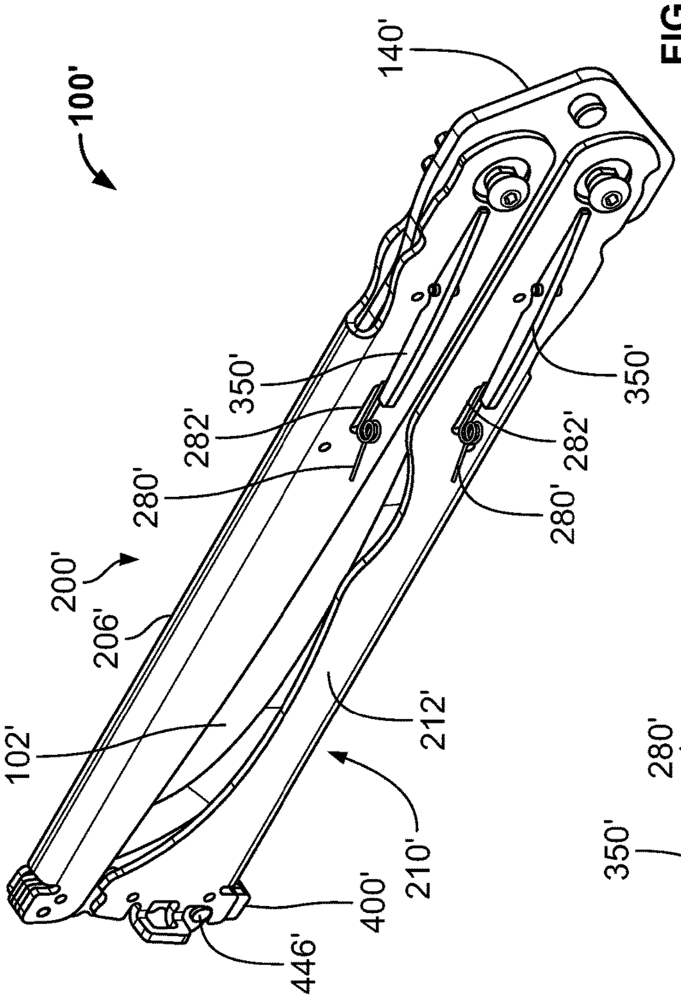
FIG. 28A is a perspective view of the folding machete of FIG. 25, shown in the closed position with scales removed.
Figure 28B:
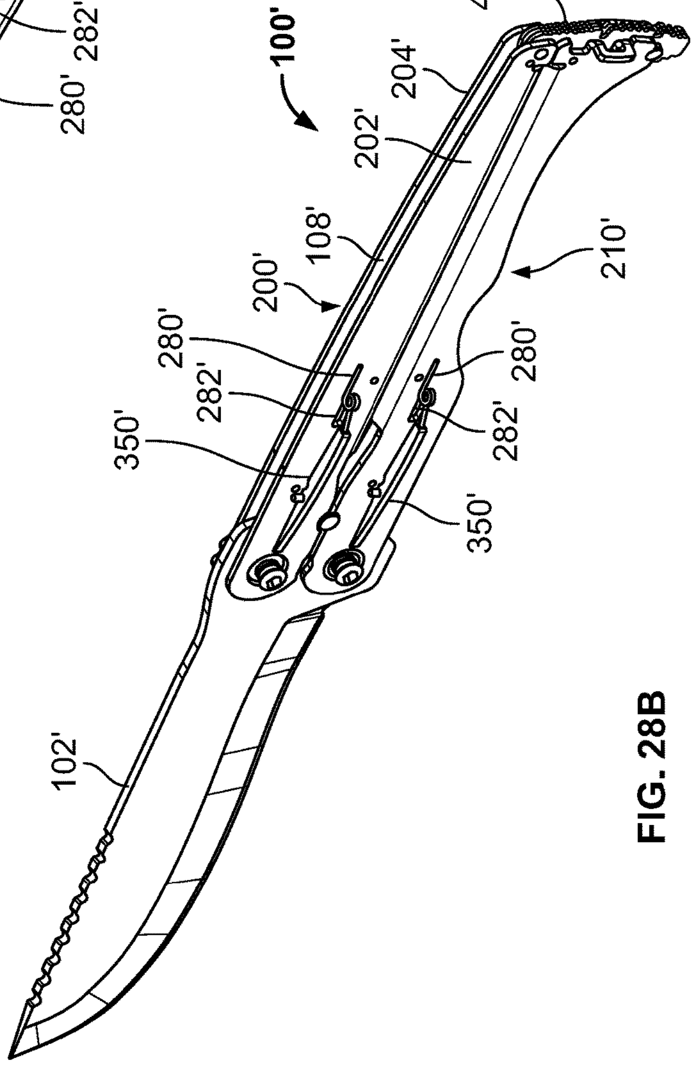
FIG. 28B is a perspective view of the folding machete of FIG. 25, shown in the open position with scales removed.
Figure 29A:
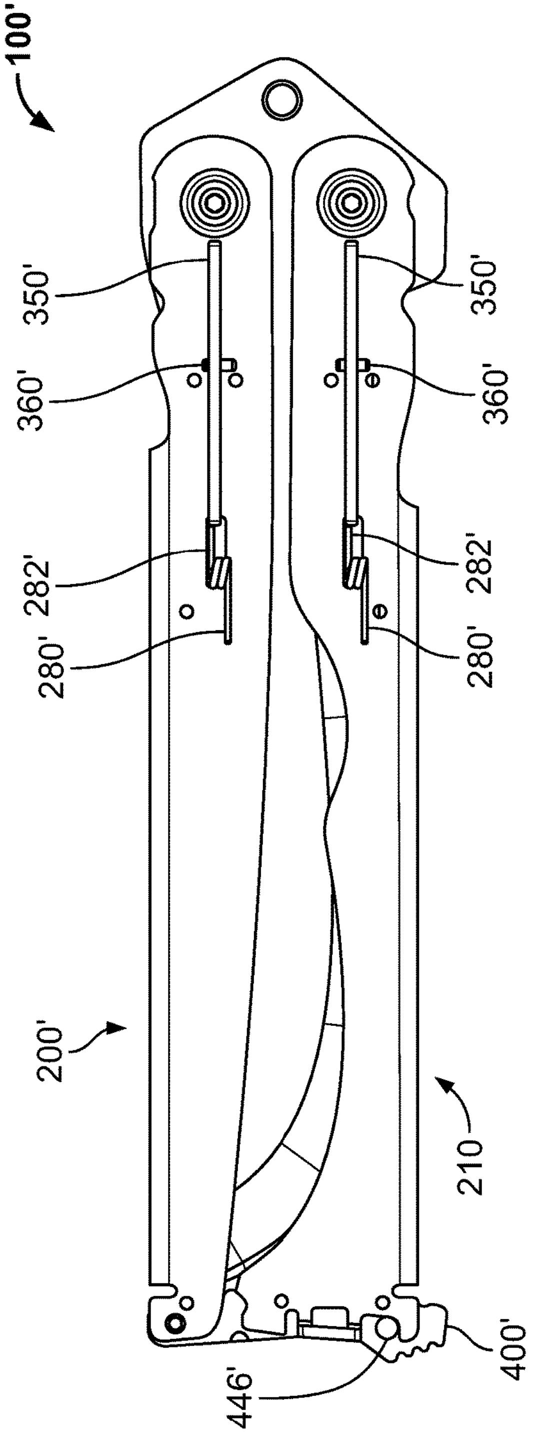
FIG. 29A is a side view of the folding machete of FIG. 28A.
Figure 29B:
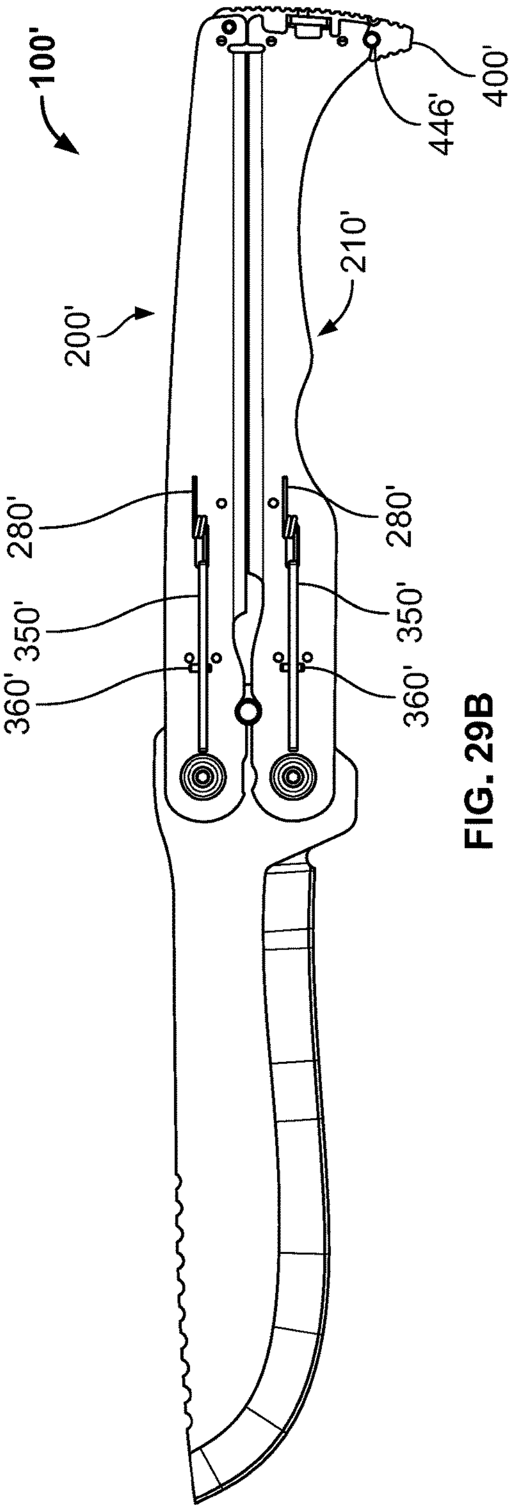
FIG. 29B is a side view of the folding machete of FIG. 28B.
Figure 30:
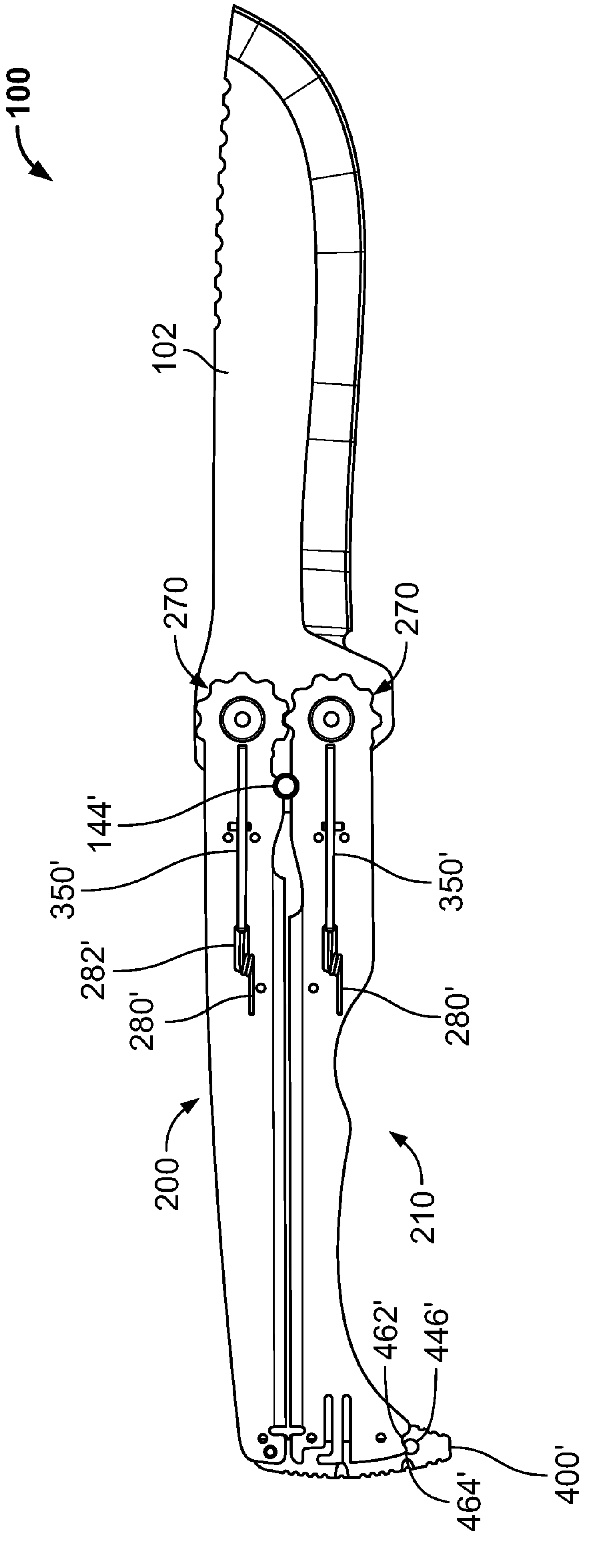
FIG. 30 is another side view of the folding machete of FIG. 29B.

The open position groove 420 can be positioned a first distance away from the axis of rotation 404. The closed position groove 430 is positioned a second distance away from the axis of rotation 404. When the top handle 104 and the bottom handle 106 are in the open position, as shown in FIG. 24, the pivot pin 226 and the latch pin 230 are spaced apart by the first distance such that the latch 400 can be rotated to receive the latch pin 230 within the open position groove 420. When the open position groove 420 receives the latch pin 230, the latch 400 prevents the top handle 104 and the bottom handle 106 from moving out of the open position. When the top handle 104 and the bottom handle 106 are in the closed position, the pivot pin 226 and the latch pin 230 are spaced apart by the second distance such that the latch 400 can be rotated to receive the latch pin 230 within the closed position groove 430. When the closed position groove 430 receives the latch pin 230, the latch 400 prevents the top handle 104 and the bottom handle 106 from moving out of the closed position. Accordingly, the latch 400 may be used with or without the catches 350 to hold the top handle 104 and the bottom handle 106 in the desired position.

Because the first section 422 and the first section 432 are narrower than the latch pin 230, the first section 422 and the first section 432 interfere with the latch pin 230 as the latch pin 230 is moved into or out of the open position groove 420 or the closed position groove 430. Accordingly, to enter the second section 424 or the second section 434, the latch pin 230 deforms the latch 400. The latch 400 may be made from a material that elastically deforms under such loading (e.g., plastic, etc.). As such, the reduced width of the first section 422 and the first section 432 ensure that the latch pin 230 has a “snap fit” into the open position groove 420 or the closed position groove 430. This provides resistance to entering and exiting the open position groove 420 or the closed position groove 430, preventing the latch 400 from accidentally becoming engaged or disengaged.

Alternatively, the latch 400' can have a locking pin design that selectively engages the bottom handle 106'. The latch 400' can have a series of grooves 436' formed into the first side 408' and second side 410' of the latch 400'. The grooves 436' can extend partially or entirely through the latch 400', and can be sized to receive fasteners 222'. The grooves 436' formed in the first side 408' of the latch 400' can face away from the grooves 436' formed in the second side 410' of the latch 400'. The latch 400' can further define a groove wall 438' positioned axially between each groove 436'. In some embodiments, the latch 400' is formed by a sandwich assembly of latch bodies. Two external bodies 440' surround an internal body 442' having a different profile than the external bodies 440'. The internal body 442' may not include grooves 436', and can extend across each groove 436' to define the groove walls 438'. In some embodiments, the external bodies 440' are formed of a different material than the internal body 442'. For example, the internal body 442' may be formed from metal, while the external bodies 440' can be formed of a polymeric or, more specifically, an elastomeric material like rubber.

The latch 400' further defines a locking pin aperture 444'. The locking pin aperture 444' is positioned opposite the pin aperture 402' and can extend entirely through the latch 400' (e.g., through each of the latch bodies 440', 442'). The locking pin aperture 444' is sized to receive and secure a locking pin 446'. The locking pin 446' can form an interference fit with the locking pin aperture 444' and can be positioned within the locking pin aperture 444' to extend axially outward beyond the external bodies 440' equally in both directions.

The locking pin 446' can engage and interact with different portions of the bottom handle 106' to secure the top handle 104' and the bottom handle 106' to one another. In the closed position illustrated in FIGS. 35A-35B, the latch rotates into selective engagement with a hook-and-spring locking mechanism 448'. Hooks 450' extend away from the distal end portion 112' of the handle 106', and define a gap 452' that can receive a portion of the latch 400'. In some examples, the hooks 450' are formed integrally with each frame 212', 214' of the bottom handle frame 210'. The hooks 450' define a concave surface 454' that can be sized to receive and secure the locking pin 446'. In some embodiments, the concave surface 454' includes a peak 456' formed at an outermost edge of each hook 450'. A spring bar 458' can be formed integrally with the bottom handle frame 210' as well. The spring bar 458' cantilevers outward from the frame 210', and includes a downward-extending projection 460'. The downward extending projection 460' can contact and secure the locking pin 446' into the hook-and-spring locking mechanism 448'. When the latch 400' is swung to a closed position, the locking pin 446' contacts the peak 456' and the projection 460', urging the hooks 450' downward and urging the spring bar 458' upward. The resilience of the hooks 450' and the spring bar 458' allow limited rotation relative to the frame 210', which allows the locking pin 446' to pass beyond the peak 456' and projection 458', where it can be received and secured upon the concave surfaces 454' of each hook 450'. Simultaneously, the grooves 436' receive fasteners 222' extending through each frame 200', 210'. The hooks 450' and spring bar 458' attempt to return to rest positions, and engage the locking pin 446' to further secure the locking pin 446' within the hook-and-spring locking mechanism 448' because the gap between the protrusion 460' and the concave surface 454' is smaller than a diameter defining the locking pin 446'. Rotation in the opposite direction can be used to unlock the latch 400' from the hook-and-spring locking mechanism 448'.

Figure 36A:
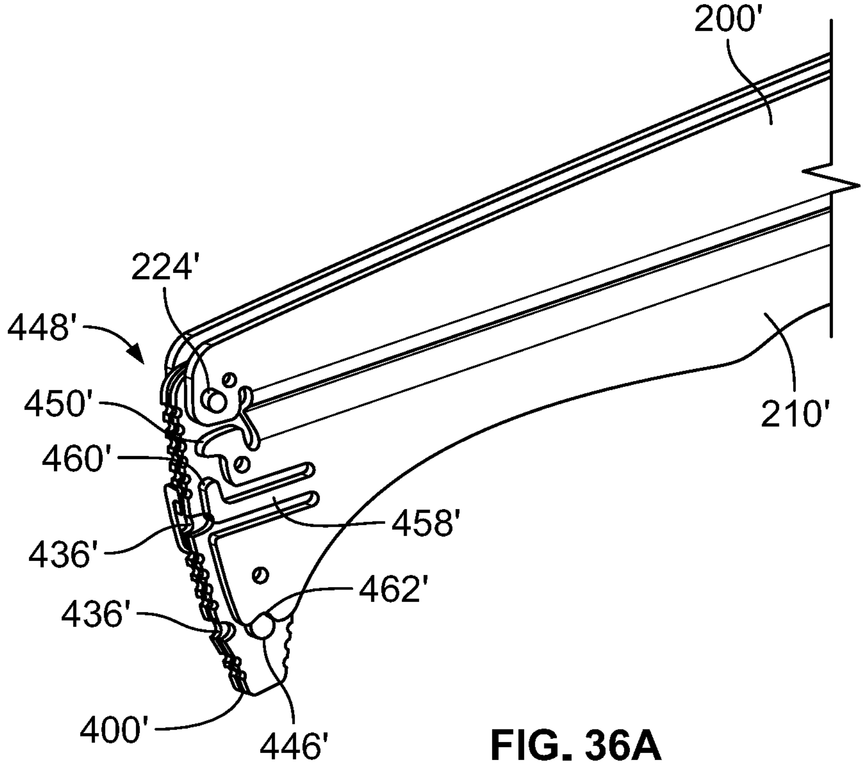
FIGS. 36A and 36B are detailed perspective views of the folding machete of FIG. 25 in an open position, with a latch in a locked position and an unlocked position.
Figure 36B:
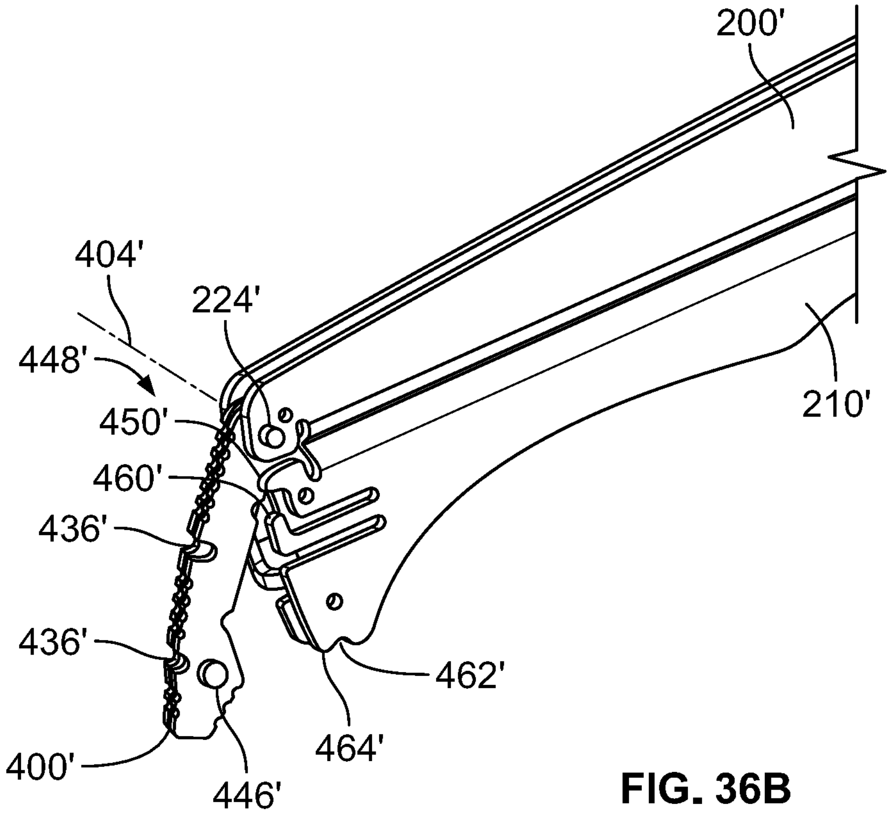
Figure 37B:
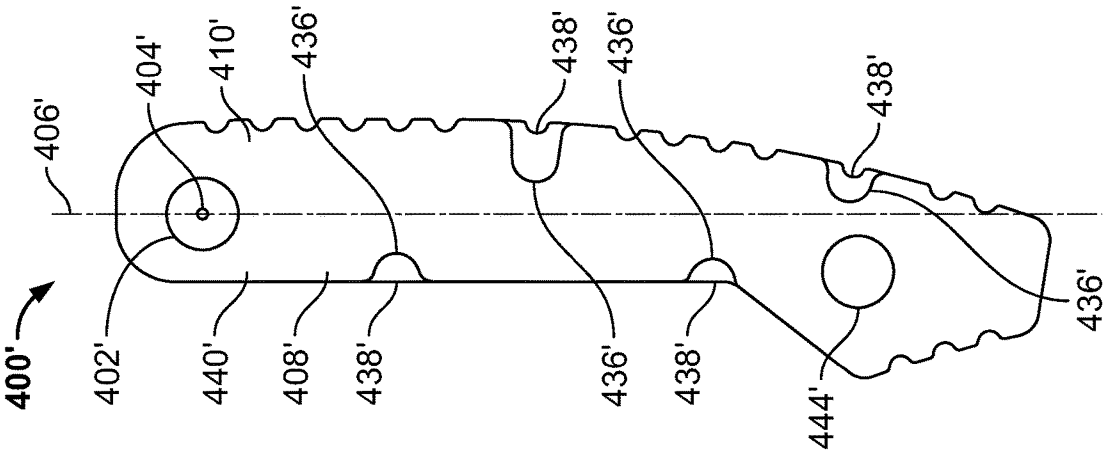
FIGS. 37A and 37B are perspective and side views of the latch of the folding machete of FIG. 25.
Figure 37A:
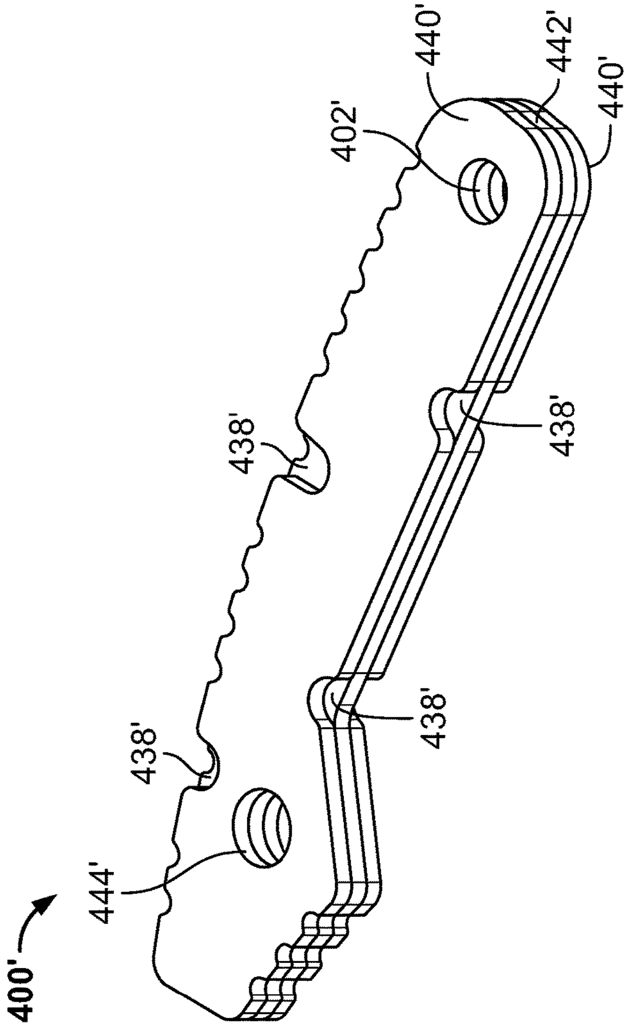

The latch 400' can lock the handles 104', 106' in the open position as well. As depicted in FIGS. 36A-36B, the latch 400' can engage the bottom handle frame 210', opposite the hook-and-spring locking mechanism 448'. For example, concave locking surfaces 462' can be formed in each plate 212', 214'. The locking surfaces 462' can include multiple inflection points and can be sized to receive and secure the locking pin 446', which then prevents rotation between the two handles 104', 106'. To lock the handles 104', 106' in the open position, the latch 400' is rotated from the top handle 104' toward the bottom handle 106'. As the latch 400' rotates toward the handle 106', the locking pin 446' initially engages an entrance peak 464' formed in the locking surface 462'. Additional rotational force allows the latch 400', handle 106', or a combination of the two components to flex slightly, allowing passage of the locking pin 446' beyond the entrance peak 464'. Continued rotation of the latch 400' allows the locking pin 446' to rotate into engagement with the locking surface 462', which can be defined by a radius similar to that of the locking pin 446'. When the locking pin 446' rotates into engagement with the locking surface 462', the grooves 436' each rotate into engagement with fasteners 222' extending inward from the frames 200', 210'. Rotational force in the opposite direction can swing the latch 400' and the locking pin 446' outward, where the handle 106' and/or the latch 400' flex until the locking pin 446' has advanced beyond the entrance peak 464', when the latch 400' can swing freely.

Figure 3:
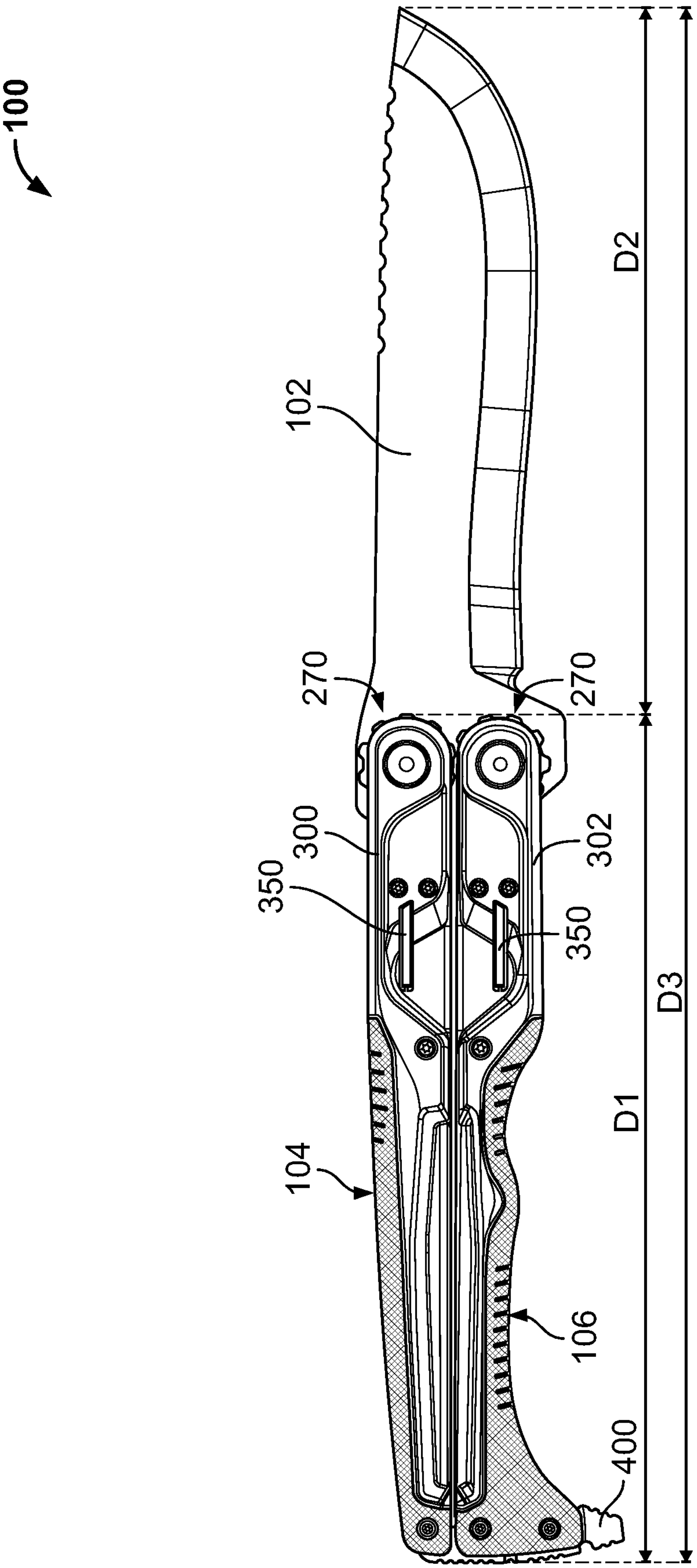
FIG. 3 is a side view of the folding machete of FIG. 1.
Figure 4:
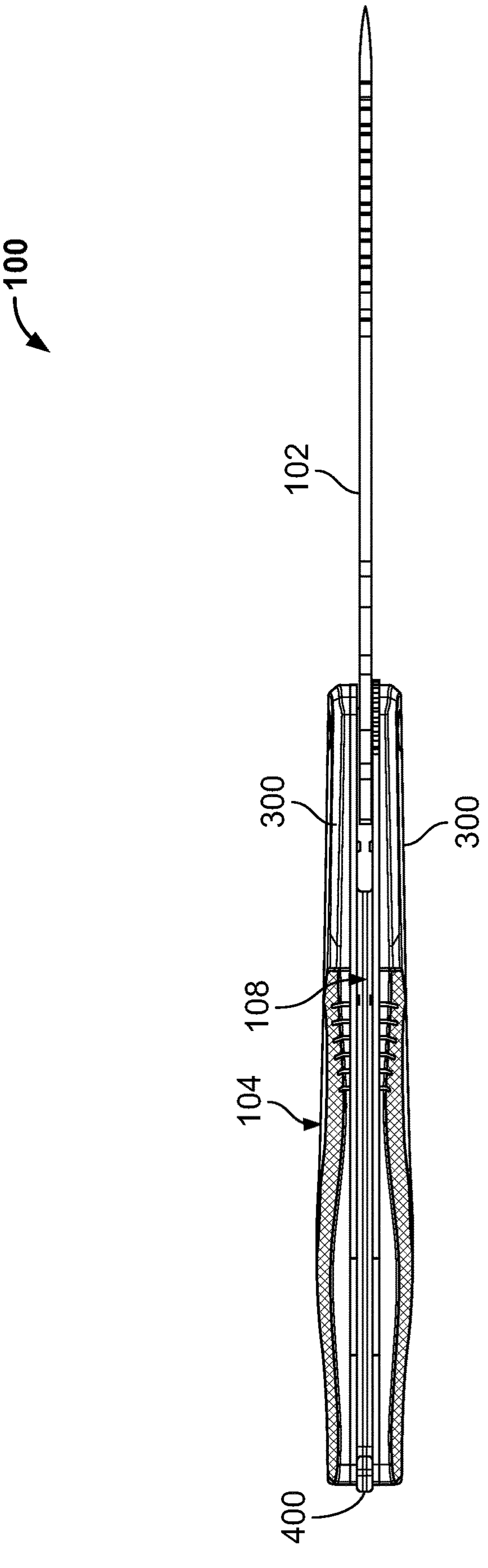
FIG. 4 is a top view of the folding machete of FIG. 1.
Figure 5:
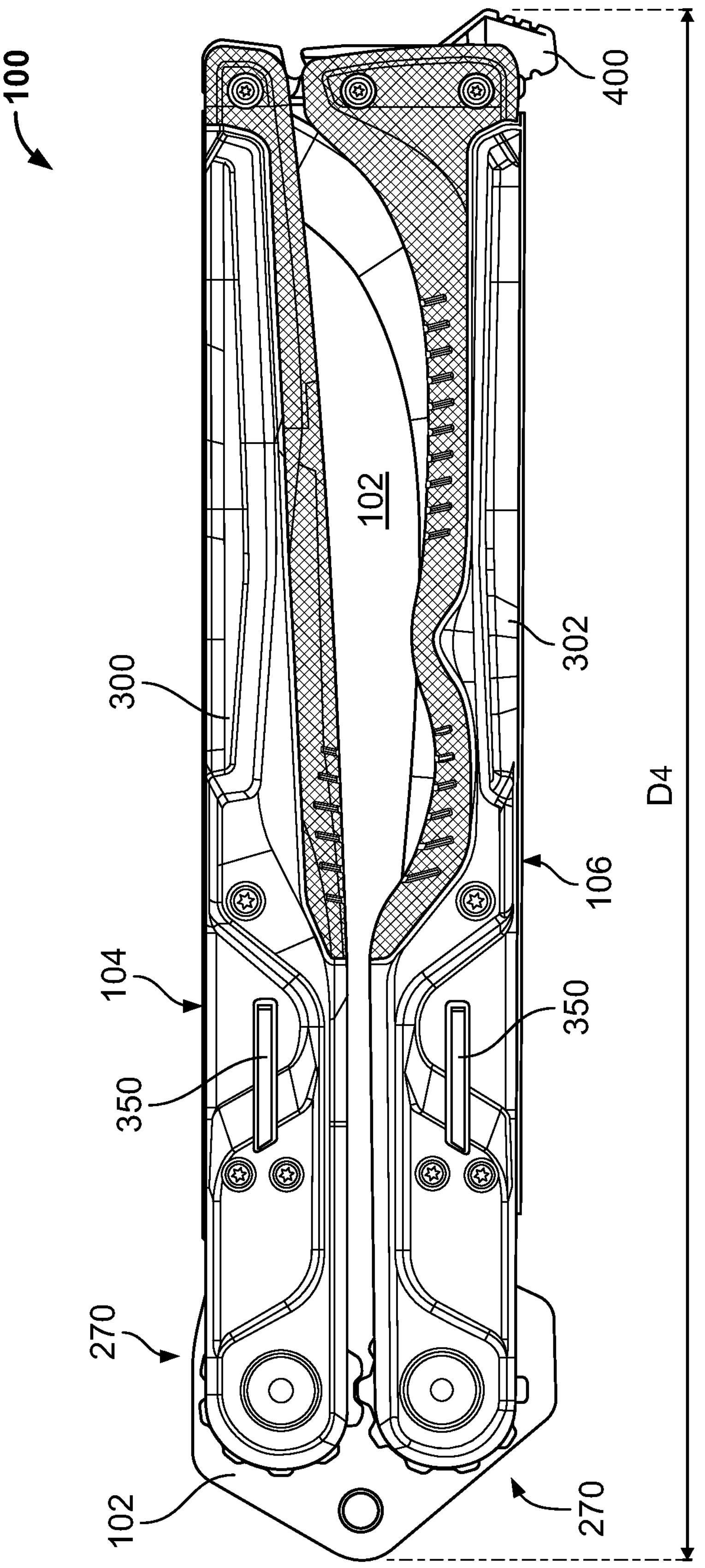
FIG. 5 is a side view of the folding machete of FIG. 1 in a closed configuration.

In some embodiments, the folding machete 100, 100' is a machete having dimensions that facilitate use as a machete. As shown in FIG. 3, with the top handle 104 and the bottom handle 106 in the open positions, a distance $D_1$ is defined between the latch 400 and the ends of the top handle 104 and the bottom handle 106 opposite the latch 400, a distance $D_2$ is defined between the ends of the top handle 104 and the bottom handle 106 opposite the latch 400 and the tip of the blade 102, and an overall length of the folding machete 100 is defined as a distance $D_3$. As shown in FIG. 5, with the top handle 104 and the bottom handle 106 in the closed positions, an overall length of the folding machete 100 is defined as a distance $D_4$. In one embodiment, the distance $D_1$ is approximately 8.4 inches, the distance $D_2$ is approximately 7.0 inches, the distance $D_3$ is approximately 15.4 inches, and the distance $D_4$ is approximately 9 inches. In other embodiments, these dimensions may vary. By way of example, the distance $D_2$ may be 5 inches, 6 inches, 8 inches, or more. Similar dimensional relationships can be used in the folding machete 100'.

Various modifications of the folding machete 100, 100' are contemplated. In one alternative embodiment, the top handle 104 and the latch 400 are omitted, and solely the bottom handle 106 is used to manipulate the folding machete 100. In such an embodiment, the catches 350 stop the bottom handle 106 from moving inadvertently. In other alternative embodiments, one or more of the catches 350 are omitted. With only one catch 350, the gears 270 prevent the handle without the catch from moving inadvertently. With no catches 350, the latch 400 prevents the top handle 104 and the bottom handle 106 from moving out of the closed position or the open position inadvertently. In another alternative embodiment, the frame 200 and the top scales 300 are integrally formed as a single body, and the frame 210 and the bottom scales 302 are integrally formed as a single body.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges or geometric relationships provided. Accordingly, these terms should be interpreted as indicating that insubstantial or inconsequential modifications or alterations of the subject matter described and claimed are considered to be within the scope of the invention as recited in the appended claims

What is claimed is:

1. A knife, comprising:

a blade defining a pair of apertures;

a first handle pivotably coupled to the blade and selectively repositionable between a first position and a second position relative to the blade;

a second handle pivotably coupled to the blade and selectively repositionable between a third position and a fourth position relative to the blade;

a first catch extending between a first catch end and a second catch end, the first catch movably coupled to the first handle and including a first protrusion proximate the first catch end;

a first spring coupled to the first handle and configured to apply a first biasing force on the first catch proximate the second catch end;

a second catch extending between a third catch end and a fourth catch end, the second catch movably coupled to the second handle and including a second protrusion proximate the third catch end; and a second spring coupled to the second handle and configured to apply a second biasing force on the second catch proximate the fourth catch end, wherein the first biasing force biases the first protrusion of the first catch toward the blade such that the first protrusion is received within a first one of the pair of apertures when the first handle is in the first position to restrict rotation of the first handle relative to the blade, and the second biasing force biases the second protrusion of the second catch toward the blade such that the second protrusion is received within a second one of the pair of apertures when the second handle is in the third position to restrict rotation of the second handle relative to the blade, wherein the first handle rotates from the first position to the second position in a first direction about a first pivot axis and the second handle rotates from the third position to the fourth position in a second direction opposite the first direction about a second pivot axis, wherein the second pivot axis is different than the first pivot axis.

2. The knife of claim 1, wherein the first spring includes a first torsion spring and the second spring includes a second torsion spring.

3. The knife of claim 1, wherein the first handle and the second handle are rotatably coupled such that repositioning the first handle from between the first position to the second position causes the second handle to reposition from between the third position to the fourth position.

4. The knife of claim 1, wherein the first handle and the second handle are rotatably coupled, such that while positioned in the second one of the pair of apertures, the second protrusion is configured to engage the blade to prevent the second handle from moving thereby preventing the first handle from moving from the first position.

5. The knife of claim 4, wherein the first handle and the second handle are rotatably coupled, such that while positioned in the first one of the pair of apertures, the first protrusion is configured to engage the blade to prevent the first handle from moving thereby preventing the second handle from moving from the third position to the fourth position.

6. The knife of claim 1, further comprising a catch pin coupled to the first catch and extending along a catch pin axis, wherein the first catch is configured to rotate about an axis of rotation that is parallel to the catch pin axis.

7. The knife of claim 6, wherein the first handle defines a catch pin recess configured to receive a portion of the catch pin.

8. The knife of claim 6, wherein the first catch defines a catch pin aperture configured to receive the catch pin.

9. The knife of claim 8, wherein the catch pin aperture is located proximate a midpoint between the first catch end and the second catch end.

10. The knife of claim 1, wherein the first spring includes a spring tab and the first handle defines a spring tab aperture configured to receive the spring tab.

11. The knife of claim 1, wherein the first one of the pair of apertures is a first blade aperture and the second one of the pair of apertures is a second blade aperture, wherein the first protrusion is received by the second blade aperture to restrict rotation of the first handle and the second handle relative to the blade when the first handle is in the second position.

12. A knife, comprising:

a blade defining a pair of apertures;

a first handle pivotably coupled to the blade and selectively repositionable between a first position and a second position relative to the blade, the first handle defining first gear teeth;

a second handle pivotably coupled to the blade and selectively repositionable between a third position and a fourth position relative to the blade, wherein when the first handle is between the first and second positions and the second handle is between the third and fourth positions, repositioning the first handle causes the second handle to reposition;

a first catch extending between a first catch end and a second catch end, the first catch movably coupled to the first handle and including a first protrusion proximate the first catch end; and a first spring coupled to the first handle and configured to apply a first biasing force on the first catch proximate the second catch end, a second catch extending between a third catch end and a fourth catch end, the second catch movably coupled to the second handle and including a second protrusion proximate the third catch end; and a second spring coupled to the second handle and configured to apply a second biasing force on the second catch proximate the fourth catch end, wherein the first biasing force biases the first protrusion of the first catch toward the blade such that the first protrusion is received within a first one of the pair of apertures when the first handle is in the first position to restrict rotation of the first handle relative to the blade, and the second biasing force biases the second protrusion of the second catch toward the blade such that the second protrusion is received within a second one of the pair of apertures when the second handle is in the third position to restrict rotation of the second handle relative to the blade, wherein the first handle rotates from the first position to the second position in a first direction about a first pivot axis and the second handle rotates from the third position to the fourth position in a second direction opposite the first direction about a second pivot axis, wherein the second pivot axis is different than the first pivot axis.

13. The knife of claim 12, wherein the first handle and the second handle are rotatably coupled, such that while positioned in the second one of the pair of apertures, the second protrusion is configured to engage the blade to prevent the second handle from moving thereby preventing the first handle from moving from the first position.

14. The knife of claim 13, wherein the first handle and the second handle are rotatably coupled, such that while positioned in the first one of the pair of apertures, the first protrusion is configured to engage the blade to prevent the first handle from moving thereby preventing the second handle from moving from the third position to the fourth position.

15. The knife of claim 12, further comprising a catch pin coupled to the first catch and extending along a catch pin axis, wherein the first catch is configured to rotate about an axis of rotation that is parallel to the catch pin axis.

16. The knife of claim 15, wherein the first handle defines a catch pin recess configured to receive a portion of the catch pin.

17. The knife of claim 15, wherein the first catch defines a catch pin aperture configured to receive the catch pin.

18. The knife of claim 17, wherein the catch pin aperture is located proximate a midpoint between the first catch end and the second catch end.

19. The knife of claim 12, wherein the first spring includes a spring tab and the first handle defines a spring tab aperture configured to receive the spring tab.

20. The knife of claim 12, wherein the first protrusion is received by the second one of the pair of apertures to restrict rotation of the first handle and the second handle relative to the blade when the first handle is in the second position.

21. A knife, comprising:

a blade defining a pair of apertures;

a first handle pivotably coupled to the blade and selectively repositionable between a first position and a second position relative to the blade;

a second handle pivotably coupled to the blade and selectively repositionable between a third position and a fourth position relative to the blade;

a first catch extending between a first catch end and a second catch end, the first catch movably coupled to the first handle and including a first protrusion proximate the first catch end; and a first spring coupled to the first handle and configured to apply a first biasing force on the first catch proximate the second catch end, a second catch extending between a third catch end and a fourth catch end, the second catch movably coupled to the second handle and including a second protrusion proximate the third catch end; and a second spring coupled to the second handle and configured to apply a second biasing force on the second catch proximate the fourth catch end, wherein the first biasing force biases the first protrusion of the first catch toward the blade such that the first protrusion is received within a first one of the pair of apertures when the first handle is in the first position to restrict rotation of the first handle relative to the blade, and the second biasing force biases the second protrusion of the second catch toward the blade such that the second protrusion is received within a second one of the pair of apertures when the second handle is in the third position to restrict rotation of the second handle relative to the blade, wherein the first handle rotates from the first position to the second position in a first direction about a first pivot axis and the second handle rotates from the third position to the fourth position in a second direction opposite the first direction about a second pivot axis, wherein the second pivot axis is different than the first pivot axis, and wherein while positioned in the second one of the pair of apertures, the second protrusion is configured to engage the blade to prevent the second handle from moving preventing the first handle from moving from the first position.

* * * * *